US011829877B2

(12) United States Patent
Kerenidis et al.

(10) Patent No.: US 11,829,877 B2
(45) Date of Patent: Nov. 28, 2023

(54) CLASSICAL AND QUANTUM ALGORITHMS FOR ORTHOGONAL NEURAL NETWORKS

(71) Applicant: QC Ware Corp., Palo Alto, CA (US)

(72) Inventors: Iordanis Kerenidis, Paris (FR); Jonas Landman, Paris (FR); Natansh Mathur, Paris (FR)

(73) Assignee: QC Ware Corp., Palo Alto, CA (US)

( * ) Notice: Subject to any disclaimer, the term of this patent is extended or adjusted under 35 U.S.C. 154(b) by 0 days.

(21) Appl. No.: 17/825,774

(22) Filed: May 26, 2022

(65) Prior Publication Data

US 2023/0081852 A1 Mar. 16, 2023

(30) Foreign Application Priority Data

May 27, 2021 (IN) .............................. 202141023642

(51) Int. Cl.
*G06N 10/20* (2022.01)
*G06N 3/08* (2023.01)
*G06N 10/70* (2022.01)
*G06N 10/40* (2022.01)
*G06N 3/04* (2023.01)

(52) U.S. Cl.
CPC ................ *G06N 3/08* (2013.01); *G06N 3/04* (2013.01); *G06N 10/20* (2022.01); *G06N 10/40* (2022.01); *G06N 10/70* (2022.01)

(58) Field of Classification Search
CPC ........ G06N 10/20; G06N 10/40; G06N 10/70; G06N 3/04; G06N 3/08
See application file for complete search history.

(56) References Cited

U.S. PATENT DOCUMENTS

2017/0193388 A1 7/2017 Filipp et al.
2020/0272930 A1 8/2020 Aspuru-Guzik et al.
2020/0342345 A1 10/2020 Farhi et al.
(Continued)

FOREIGN PATENT DOCUMENTS

WO WO 2004/012139 A2 2/2004
WO WO 2020/072981 A1 4/2020

OTHER PUBLICATIONS

Nosarzewski, Benjamin, Deep Orthogonal Neural Networks, Mar. 2018. (Year: 2018).*

(Continued)

*Primary Examiner* — Marshall L Werner
(74) *Attorney, Agent, or Firm* — Fenwick & West LLP

(57) ABSTRACT

Orthogonal neural networks impose orthogonality on the weight matrices. They may achieve higher accuracy and avoid evanescent or explosive gradients for deep architectures. Several classical gradient descent methods have been proposed to preserve orthogonality while updating the weight matrices, but these techniques suffer from long running times and provide only approximate orthogonality. In this disclosure, we introduce a new type of neural network layer. The layer allows for gradient descent with perfect orthogonality with the same asymptotic running time as a standard layer. The layer is inspired by quantum computing and can therefore be applied on a classical computing system as well as on a quantum computing system. It may be used as a building block for quantum neural networks and fast orthogonal neural networks.

20 Claims, 30 Drawing Sheets

(56) References Cited

U.S. PATENT DOCUMENTS

2021/0319350 A1 10/2021 Kerenidis
2021/0319351 A1 10/2021 Kerenidis

OTHER PUBLICATIONS

Tacchino et al., Quantum Implementation of an Artificial Feedforward Neural Network, Quantum Science and Technology, vol. 5, Oct. 2020. (Year: 2020).*

Allcock et al., Quantum Algorithms for Feedforward Neural Networks, Sep. 2019. (Year: 2019).*

Ramos-Calderer et al., Quantum Unary Approach to Option Pricing, Jul. 2020. (Year: 2020).*

Aaronson, S. "Quantum Machine Learning Algorithms: Read the Fine Print." Nature Physics, vol. 11, Apr. 2, 2015, pp. 1-5.

Allcock, J. et al. "Quantum Algorithms for Feedforward Neural Networks." arXiv Preprint arXiv:1812.03089v1, Dec. 7, 2018, pp. 1-18.

Bansal, N. et al. "Can We Gain More from Orthogonality Regularizations in Training Deep Networks?" $32^{nd}$ Conference on Neural Information Processing Systems (NeurIPS 2018), Dec. 2018, pp. 4266-4276.

Cong, I. et al. "Quantum Convolutional Neural Networks." arXiv Preprint arXiv: 1810.03787v2, May 2, 2019, pp. 1-12.

Farhi, E. et al. "Classification with Quantum Neural Networks on Near Term Processors." arXiv Preprint arXiv:1802.06002v2, Aug. 30, 2018, pp. 1-21.

Foxen, B. et al. "Demonstrating a Continuous Set of Two-Qubit Gates for Near-Term Quantum Algorithms." Physical Review Letters, vol. 125, Sep. 15, 2020, pp. 1-6.

Jia, K. et al. "Orthogonal Deep Neural Networks." arXiv Preprint arXiv1905.05929v2, Oct. 15, 2019, pp. 1-21.

Kerenidis, I. et al. "Classical and Quantum Algorithms for Orthogonal Neural Networks." arXiv Preprint arXiv:2106.07198v2, Dec. 26, 2022, pp. 1-22.

Kerenidis, I. et al. "Quantum Algorithms for Deep Convolutional Neural Networks." arXiv Preprint arXiv:1911.01117v1, Nov. 5, 2019, pp. 1-40.

Killoran, N. et al. "Continuous-Variable Quantum Neural Networks." Physical Review Research, vol. 1, No. 3, Oct. 31, 2019, pp. 1-22.

Lecun, Y. et al. "The MNIST Database of Handwritten Digits." New York University, Jun. 2010, 2 pages, [Online] [Retrieved Feb. 23, 2023], Retrieved from the Internet <URL:http://yann.lecun.com/exdb/mnist/>.

Lezcano-Casado, M. et al. "Cheap Orthogonal Constraints in Neural Networks: A Simple Parametrization of the Orthogonal and Unitary Group." Proceedings of the $36^{th}$ International Conference on Machine Learning, vol. 97, Jun. 9-15, 2019, pp. 3794-3803.

Nosarzewski, B. "Deep Orthogonal Neural Networks." Stanford. edu, Mar. 21, 2018, pp. 1-7.

PCT International Search Report and Written Opinion, PCT Application No. PCT/US2021/031171, dated Nov. 25, 2022, 17 pages.

PCT Invitation to Pay Additional Fees, PCT Application No. PCT/US2021/031171, dated Sep. 20, 2022, two pages.

Wang, J. et al. "Orthogonal Convolutional Neural Networks." 2020 IEEE/CVF Conference on Computer Vision and Pattern Recognition (CVPR), Jun. 13-19, 2020, pp. 11505-11515.

* cited by examiner

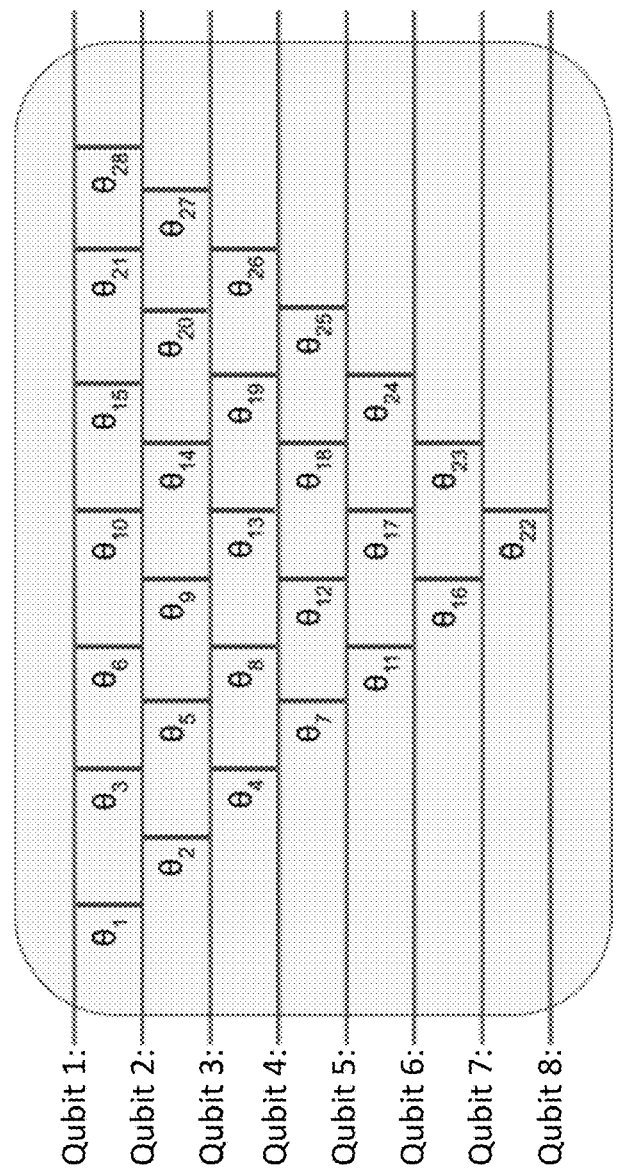
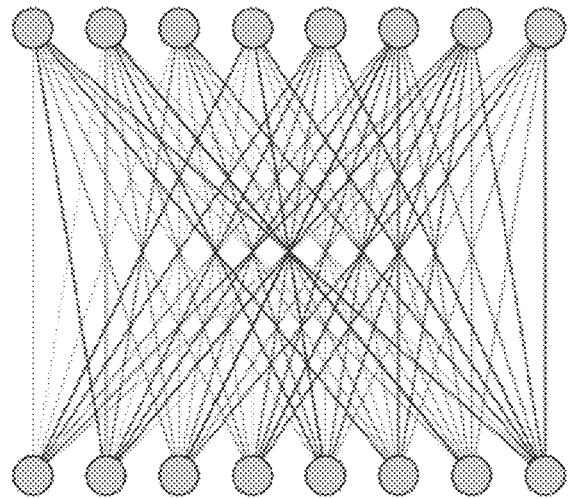
FIG. 2A
FIG. 2B

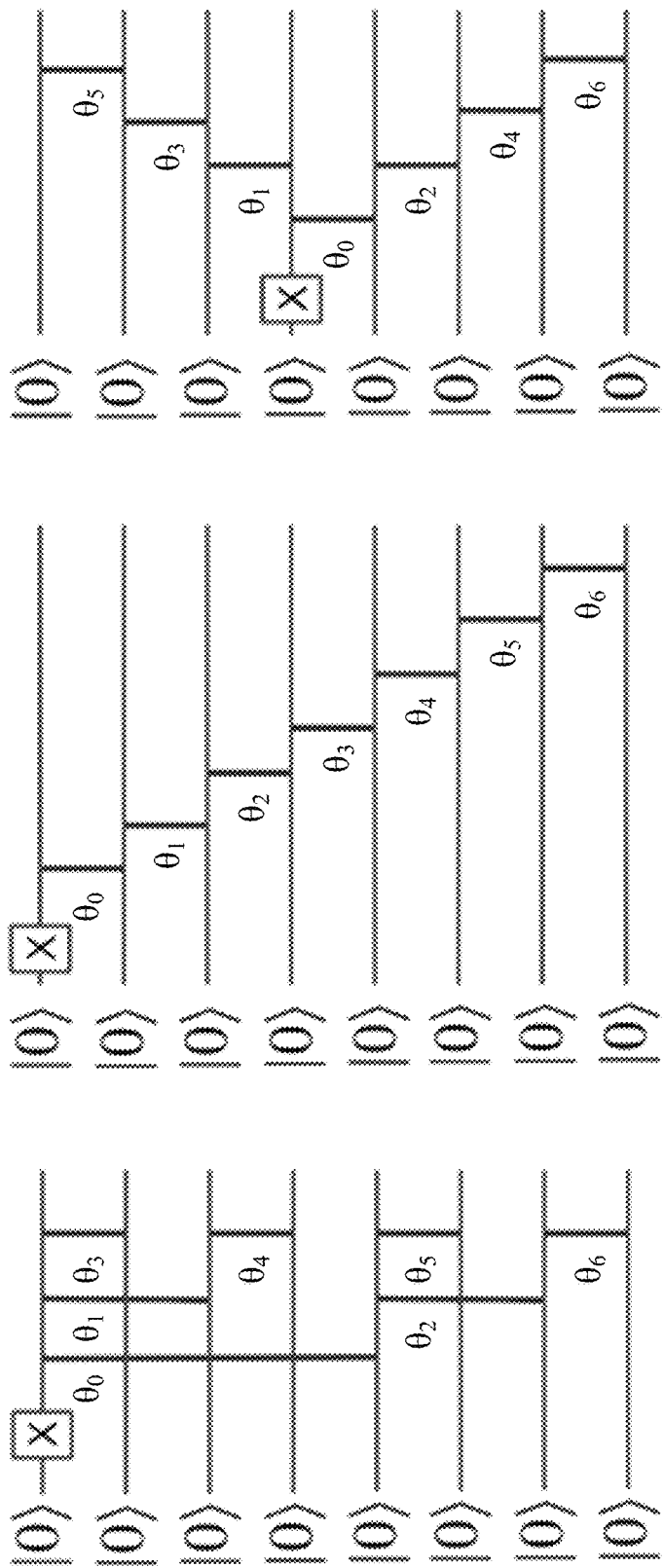

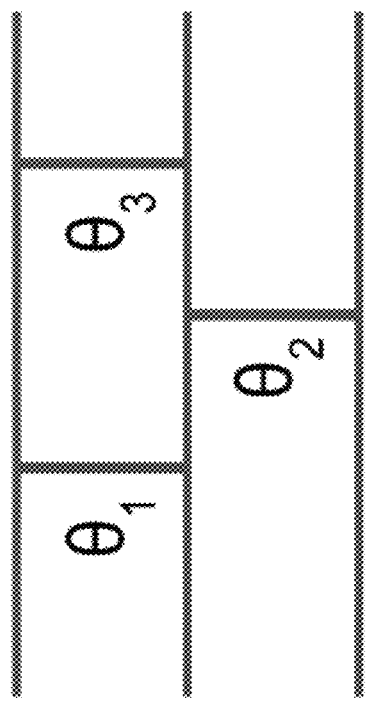
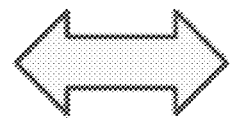
$$\begin{pmatrix} c(\theta_1)c(\theta_3) - s(\theta_1)c(\theta_2)s(\theta_3) & -s(\theta_1)c(\theta_3) - c(\theta_1)c(\theta_2)s(\theta_3) & s(\theta_2)s(\theta_3) \\ s(\theta_1)c(\theta_2)c(\theta_3) + c(\theta_1)s(\theta_3) & c(\theta_1)c(\theta_2)c(\theta_3) - s(\theta_1)s(\theta_3) & -s(\theta_2)c(\theta_3) \\ s(\theta_1)s(\theta_2) & c(\theta_1)s(\theta_2) & c(\theta_2) \end{pmatrix}$$
FIG. 6

1600

> Execute layers of a quantum circuit that apply BS gates, the number of BS gates being equal to the number of degrees of freedome of an orthogonal weight matrix for a layer of a neural network
> 1610

Execute layers of BS gates of a quantum circuit, weights of a weight matrix being based on values of parameters of the BS gates
1710

Determine gradients of a cost function with respect to parameters of the BS gates
1720

Update values of parameters of the BS gates based on the gradients of the cost function, updated values of the parameters preserving the orthogonality of the weight matrix
1730

FIG. 17

CLASSICAL AND QUANTUM ALGORITHMS FOR ORTHOGONAL NEURAL NETWORKS

CROSS-REFERENCE TO RELATED APPLICATION

This application claims priority to Indian Patent Application No. 202141023642, "Quantum Orthogonal Neural Networks," filed on May 27, 2021. The subject matter of which is incorporated herein by reference in its entirety.

BACKGROUND

1. Technical Field

This disclosure relates generally to neural networks, and more particularly, to training and using orthogonal neural networks using a quantum computing system or a classical computing system.

2. Description of Related Art

In the evolution of neural networks structures, adding constraints to the weight matrices has often been an effective path. For example, orthogonal neural networks (OrthoNNs) have been proposed as a new type of neural network for which, at each layer, the weights matrix should remain orthogonal. This property is useful to reach higher accuracy performance and avoid vanishing or exploding gradient for deep architectures. Several classical gradient descent methods have been proposed to preserve the orthogonality while updating the weights matrices. However, these techniques suffer from longer running time and sometimes only approximate the orthogonality. In particular, the main method for achieving orthogonality during training is to first perform gradient descent to update the weights matrix (which is now not going to be orthogonal) and then perform Singular Value Decomposition to orthogonalize or almost orthogonalize the weights matrix. However, achieving orthogonality hinders a fast training process, since at every step an SVD computation needs to be performed.

In the emergent field of quantum machine learning, several proposals have been made to implement neural networks. Some algorithms rely on long term and perfect quantum computers, while others try to harness the existing quantum devices using variational circuits. However, it is unclear how such architectures scale and whether they provide efficient and accurate training.

SUMMARY

This disclosure describes novel approaches for machine learning algorithms, such as deep learning algorithms. This disclosure describes a class of Neural Networks that has the property of having orthogonal weight matrices. This is an improved technique for approximating certain functions, like those for the classification of data due to the reasons described below. The neural networks described constructed may also be optimized in terms of the number of gates, scaling time of training, and type of gates in the circuit.

Orthogonal neural networks may provide an advantage for deep neural networks, that is neural networks with a large number of layers. They may preserve the norms both during the forward and backward pass. This property enables the prevention of gradient vanishing and explosion, which is prominent in deep neural networks. Such neural networks also have the property of non-redundancy in the weights since the vectors are orthogonal and linearly independent, thereby each of them giving "different" information about the input-output relation.

Some embodiments relate to a quantum architecture for a connected neural network that offers orthogonality in the weight matrices. In some embodiments, the neural network comprises a quantum circuit shaped like an inverted pyramid for each layer of the neural network.

Some embodiments relate to using a unary preserving quantum circuit (e.g., with BS gates as described in Section 2) to form a layer of an orthogonal neural network. The layer may be trained in $O(n)$ time where n is the number of input nodes of the layer. Data may be loaded into the layer using a data loader e.g., as described in Section 2.

Other aspects include components, devices, systems, improvements, methods, processes, applications, computer readable mediums, and other technologies related to any of the above.

BRIEF DESCRIPTION OF THE DRAWINGS

Embodiments of the disclosure have other advantages and features which will be more readily apparent from the following detailed description and the appended claims, when taken in conjunction with the examples in the accompanying drawings, in which:

FIG. 2A is a diagram of a quantum circuit for an 8×8 orthogonal layer of a neural network.

FIG. 2B is a diagram of a classical 8×8 orthogonal layer of a neural network.

FIGS. 4B-D are diagrams of other data loader circuits.

FIG. 6 is a diagram of a three-qubit pyramidal circuit and an orthogonal matrix associated with the circuit.

FIG. 16 is a flowchart of a method for executing a quantum circuit to implement a layer of a neural network.

FIG. 17 is a flowchart of a method for training a layer of a neural network with an orthogonal weight matrix.

DETAILED DESCRIPTION OF THE PREFERRED EMBODIMENTS

Figure 1:
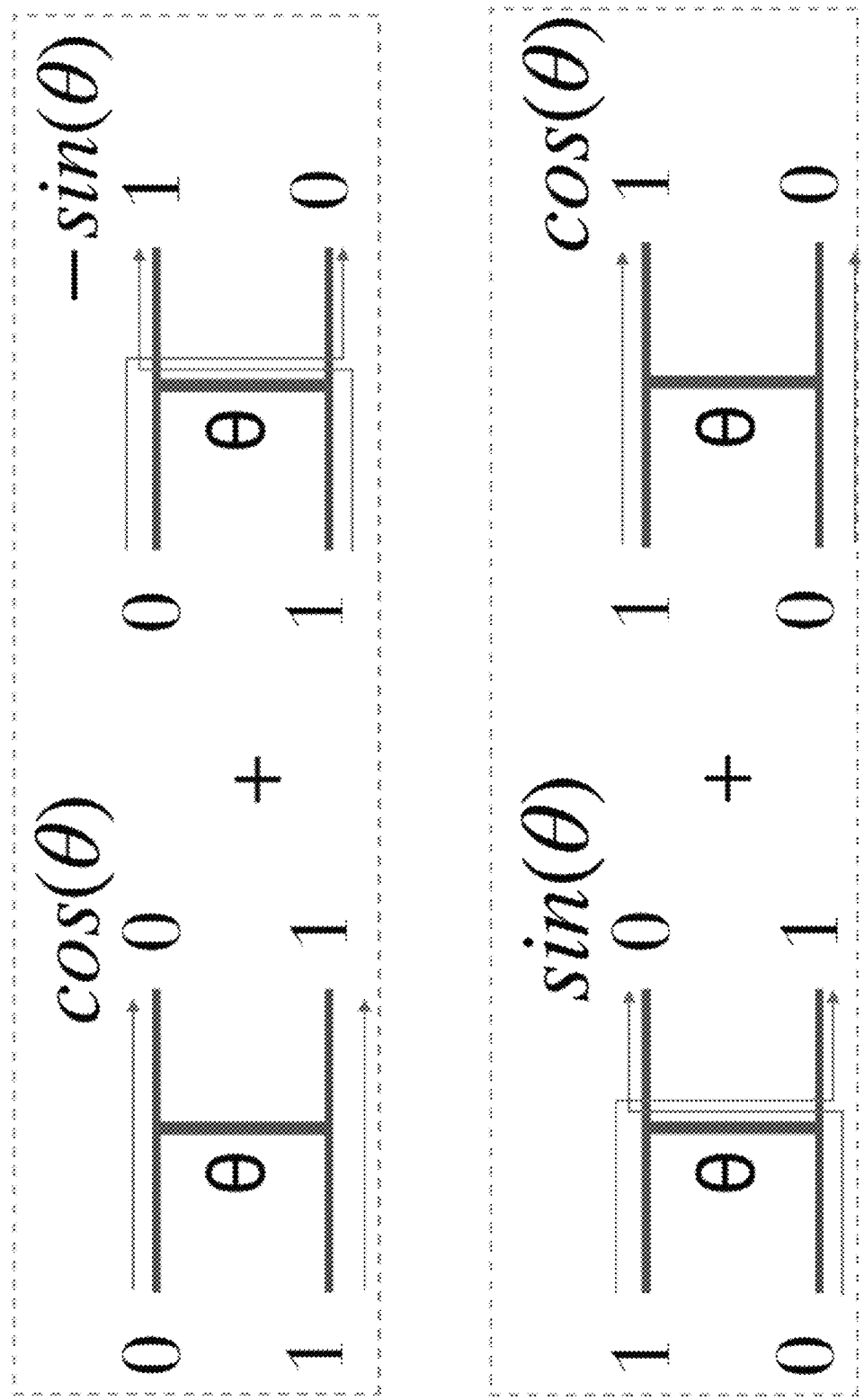
FIG. 1 is a diagram that represents the quantum mapping for a BS quantum gate.

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

1. Introduction

This disclosure presents a new training method for neural networks that preserves (e.g., perfect) orthogonality while having the same running time as usual gradient descent methods without the orthogonality condition, thus achieving the best of both worlds, most efficient training and perfect orthogonality.

One of the main ideas comes from the quantum world, where any quantum circuit corresponds to an operation described by a unitary matrix, which if we only use gates with real amplitudes, is an orthogonal matrix. In particular, this disclosure describes a novel special-architecture quantum circuit, for which there is an efficient way to map the elements of an orthogonal weights matrix to the parameters of the gates of the quantum circuit and vice versa. Thus, while performing a gradient descent on the elements of the weights matrix individually does not preserve orthogonality, performing a gradient descent on the parameters of the quantum circuit does preserve orthogonality (since any quantum circuit with real parameters corresponds to an orthogonal matrix) and is equivalent to updating the weights matrix. This disclosure also proves that performing gradient descent on the parameters of the quantum circuit can be done efficiently classically (with constant update cost per parameter) thus concluding that there exists a quantum-inspired, but fully classical way of efficiently training perfectly orthogonal neural networks.

Moreover, the special-architecture quantum circuit defined herein has many properties that make it a good candidate for NISQ (Noisy Intermediate-Scale Quantum) implementations: it may use only one type of quantum gate, may use a simple connectivity between the qubits, may have depth linear in the input and output node sizes, and may benefit from powerful error mitigation techniques that make it resilient to noise. This allows us to also propose an inference method running the quantum circuit on data which might offer a faster running time (e.g., given the shallow depth of the quantum circuit).

Some of our contributions are summarized in Table 1 (below), where we have considered the time to perform a feedforward pass, or one gradient descent step. A single neural network layer is considered, with input and output of size n. For example, the methods described in this disclosure are just as fast as other methods during the feedforward pass. Additionally, the algorithms in this disclosure are faster than other orthogonal methods and just as fast as non-orthogonal methods in the matrix update process.

TABLE 1

Running times summary, n is the size of the input and output vectors, $\delta$ is the error parameter in the quantum implementation.

| Method | Feedforward Pass | Orthogonal matrix update |
| --- | --- | --- |
| Quantum Pyramidal Circuit (This disclosure) | $2n/\delta^2 = O(n/\delta^2)$ | $O(n^2/\delta^2)$ |
| Classical Pyramidal Circuit (This disclosure) | $2n(n-1) = O(n^2)$ | $O(n^2)$ |
| Classical Approximated OrthoNN (SVB) | $n^2 = O(n^2)$ | $O(n^3)$ |
| Classical Strict OrthoNN (Stiefel Manifold) | $n^2 = O(n^2)$ | $O(n^3)$ |
| Standard Neural Network (non orthogonal) | $n^2 = O(n^2)$ | $O(n^2)$ |

2. A Parametrized Quantum Circuit for Orthogonal Neural Networks

In this section we define a special-architecture parametrized quantum circuit that may be useful for performing training and inference on orthogonal neural networks. As we said, the training may be (e.g., completely) classical in the end, but the intuition of the new method comes from this quantum circuit, while the inference can happen classically or by applying this quantum circuit. A basic introduction to quantum computing concepts for this work is given in Sections 9 and 12.

2.1 The BS Gate

The quantum circuits proposed in this work that implement fully connected neural network layers with orthogonal weight matrices may use only one type of quantum gate: the Reconfigurable Beam Splitter (BS) gate. The BS gate is a parametrizable two-qubit gate. This two-qubit gate may be considered hardware efficient, and it may have one parameter: angle $\theta \in [0, 2\pi]$. An example matrix representation of the BS gate is given as:

$$BS(\theta) = \begin{pmatrix} 1 & 0 & 0 & 0 \\ 0 & \cos\theta & \sin\theta & 0 \\ 0 & -\sin\theta & \cos\theta & 0 \\ 0 & 0 & 0 & 1 \end{pmatrix} \quad BS(\theta): \begin{cases} |01\rangle \mapsto \cos\theta|01\rangle - \sin\theta|10\rangle \\ |10\rangle \mapsto \sin\theta|01\rangle + \cos\theta|10\rangle \end{cases} \quad (1)$$

The BS gate may be represented by other similar matrices. For example, the rows and columns of the above matrix can be permuted, a phase element $e^{i\varphi}$ may be introduced instead of the "1" at matrix position (4,4), or the two elements $\sin(\theta)$ and $-\sin(\theta)$ may be changed to, for example, $i*\sin(\theta)$ and $i*\sin(\theta)$. The above BS gate can also be decomposed in a set of two- and one-qubit parametrized gates. All these gates are practically equivalent, and our methods can use any of them. Thus, as used herein, "BS gate" may refer to any of these gates. Here are some specific examples of alternative BS gates, however, this list is not exhaustive:

$BS_1(\theta) = [[1, 0, 0, 0], [0, \cos(\theta), -i*\sin(\theta), 0], [0, -i*\sin(\theta), \cos(\theta), 0], [0, 0, 0, 1]]$;

$BS_2(\theta) = [[1, 0, 0, 0], [0, \cos(\theta), \sin(\theta), 0], [0, \sin(\theta), -\cos(\theta), 0], [0, 0, 0, 1]]$;

$BS_3(\theta, \varphi)$=[[1, 0, 0, 0], [0, cos($\theta$), −i*sin($\theta$), 0], [0, −i*sin($\theta$), cos($\theta$), 0], [0, 0, 0, $e^{-i\varphi}$]]; and $BS_4(\theta, \varphi)$=[[1, 0, 0, 0], [0, cos($\theta$), sin($\theta$), 0], [0, −sin($\theta$), cos($\theta$), 0], [0, 0, 0, $e^{-i\varphi}$]].

We can think of the BS gate as a rotation in the two-dimensional subspace spanned by the basis {|01⟩, +10⟩, while it acts as the identity in the remaining sub space {|00⟩, |11⟩}. Or equivalently, starting with two qubits, one in the |0⟩ state and the other one in the state |1⟩, the qubits can be swapped or not in superposition. The qubit |1⟩ stays on its wire with amplitude cos $\theta$ or switches with the other qubit with amplitude+sin $\theta$ if the new wire is below (|10⟩ ↦ |01⟩) or −sin $\theta$ if the new wire is above (|01⟩ ↦ |10⟩). Note that in the two other cases (|00⟩ and |11⟩) the BS gate acts as identity. FIG. 1 is a diagram that represents the quantum mapping of a BS gate on two qubits.

2.2 Quantum Pyramidal Circuit

We now propose a quantum circuit that implements an orthogonal layer of a neural network. The circuit is a pyramidal structure of BS gates, each with an independent angle. More details are provided below concerning the input loading and the equivalence with a neural network's orthogonal layer.

To mimic a given classical layer with a quantum circuit, the number of output qubits may be the size of the classical layer's output. We refer to the square case when the input and output sizes are equal, and to the rectangular case otherwise.

One property to note is that the number of parameters of the quantum pyramidal circuit corresponding to a neural network layer of size n×d is (2n−1−d)*d/2, which is the same as the number of degrees of freedom of an orthogonal matrix of dimension n x d (the least number of parameters that uniquely define the orthogonal matrix).

FIGS. 2A and 2B are example diagrams. FIG. 2A illustrates a quantum circuit for an 8×8 fully connected, orthogonal layer of a neural network. Each vertical line corresponds to an BS gate with its angle parameter O. Note that FIG. 2A includes qubit labels. For simplicity, other circuit diagrams herein do not include qubit labels. FIG. 2B illustrates the equivalent classical orthogonal neural network 8×8 layer.

For simplicity, our analysis considers the square case (i.e., n input nodes and n output nodes) but everything can be easily extended to the rectangular case (i.e., n input nodes and p≠n output nodes). As stated, the pyramidal structure of the quantum circuit described above imposes the number of free parameters to be N=n(n−1)/2, which is the exact number of free parameters to specify an n×n orthogonal matrix. Said differently, there is an efficient one-to-one mapping between the N=n(n−1)/2 parameter angles {$\theta_i$: i∈[N]} of the gates in the inverted pyramid and the N=n(n−1)/2 degrees of freedom of an n×n orthogonal matrix W with entries $w_{ij}$. In the example case of FIG. 2A with n=8, we have N=28, which is the number of gates and the number of free elements of an 8×8 orthogonal matrix.

In Section 3 we show how the parameters of the gates of this pyramidal circuit can be related to the elements of the orthogonal matrix of size n×n that describes it. We note that alternative architectures can be imagined as long as the number of gate parameters is equal to the parameters of the orthogonal weights matrix and a (e.g., simple) mapping between them and the elements of the weights matrix can be found.

Note that this pyramid circuit has linear depth and is convenient for near term quantum hardware platform with restricted connectivity. Indeed, the example distribution of the BS gates uses only nearest neighbor connectivity between qubits in the circuit diagram. However, alternative versions may or may not use nearest neighbor connectivity (examples later).

Figure 3A:
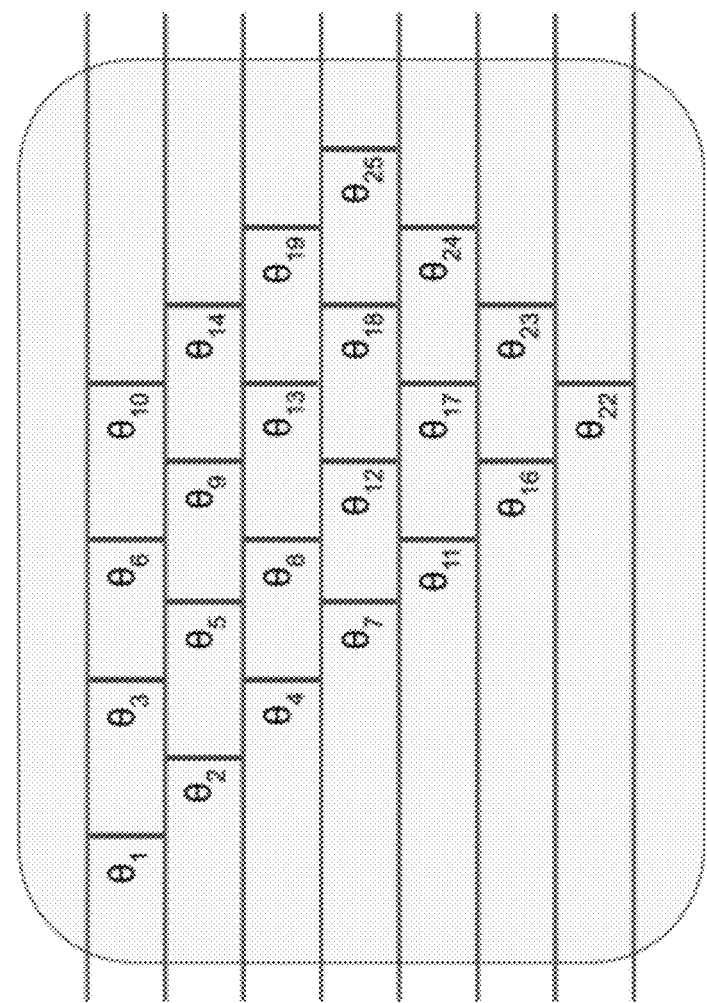
FIG. 3A is a diagram of a quantum circuit for a rectangular 8×4 orthogonal layer of a neural network.
Figure 3B:
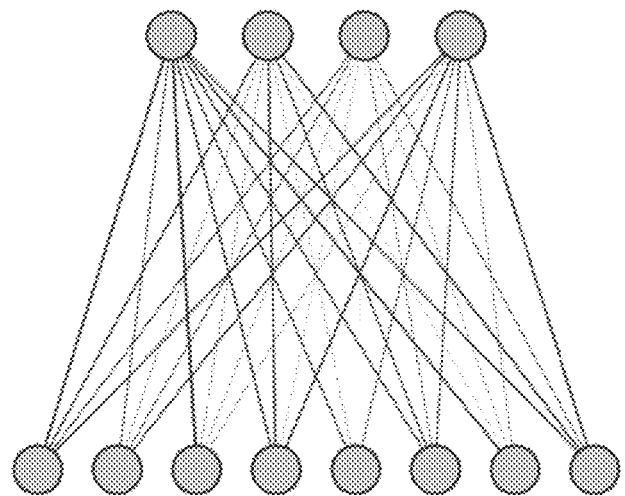
FIG. 3B is a diagram of a classical 8×4 orthogonal layer of a neural network.

FIG. 3A is a diagram of a quantum circuit for a rectangular 8×4 fully connected orthogonal layer, and FIG. 3B is a diagram of the equivalent 8×4 classical orthogonal neural network. They both have 22 free parameters.

Although FIGS. 2A and 3A illustrate gates arranged in an inverted pyramid shape, other shapes are possible to implement a layer of a neural network. For example, BS gates may be arranged according to a right side up pyramid. In another example, the BS gates may be arranged according to a triangle shape. Furthermore, the inverted pyramid shapes illustrated in FIGS. 2A and 3A are a result of the BS gates being applied to adjacent qubits in the circuit diagram. However, in other embodiments, one or more BS gates may be applied to qubits that are not adjacent in the circuit diagram. In these embodiments, the BS gates may form other shapes (e.g., non-pyramid shapes). Descriptions of pyramidal circuits in this disclosure may be applicable to these other circuit arrangements. Additionally, Section 11 describes different types of circuits that can implement a layer of a neural network. Descriptions of pyramidal circuits in this disclosure may also be applicable to these circuits.

2.3 Loading the Data

Before applying the quantum pyramidal circuit, the classical data may be uploaded into the quantum circuit. We may use one qubit per feature of the data. For this, we use a unary amplitude encoding of the input data. Let's consider an input sample x=($x_0$, ..., $x_{n-1}$)∈ $\mathbb{R}^n$, such that $\|x\|_2$=1. The sample can be encoded in a superposition of unary states:

$$|x\rangle = x_0|10 \ldots 0\rangle + x_1|010 \ldots 0\rangle + \ldots + x_{n-1}|0 \ldots 01\rangle \quad (2)$$

The previous state can be rewritten using $|e_i\rangle$ to represent the $i^{th}$ unary state with a |1⟩ in the $i^{th}$ position |0 ... 010 ... 0⟩, as:

$$|x\rangle = \sum_{i=0}^{n-1} x_i |e_i\rangle \quad (3)$$

Although a logarithmic depth data loader circuit can be used for loading such states, a simpler circuit may be used. It is a linear depth cascade of n−1 BS gates which, due to the structure of our quantum pyramidal circuit, may only add 2 extra steps to our pyramid circuit. An example of this linear depth cascade circuit (also referred to as the "diagonal loader") is illustrated in FIG. 4A.

Figure 4A:
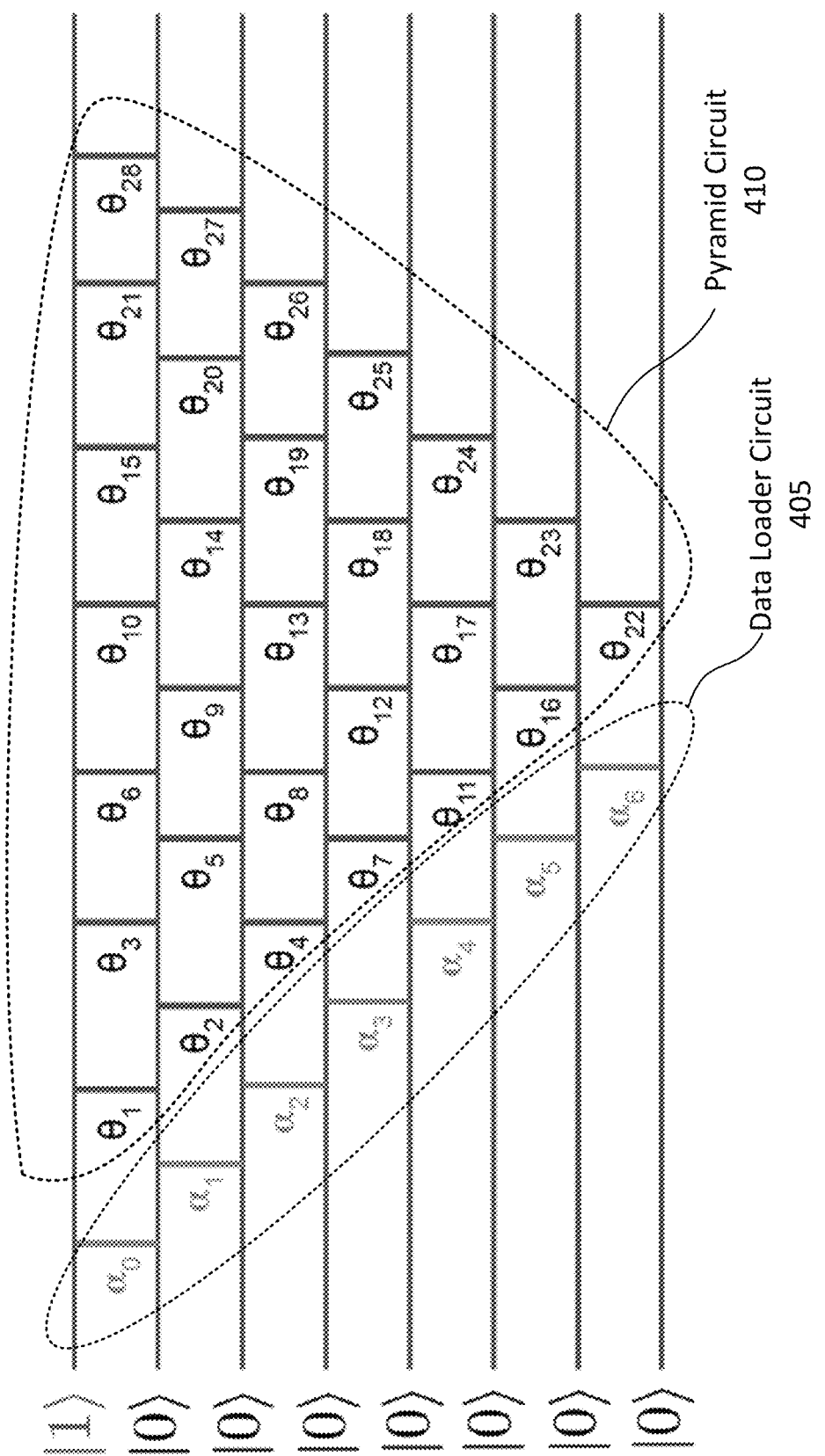
FIG. 4A is a diagram of a quantum circuit that includes a linear cascade data loader circuit.

FIG. 4A is a diagram that includes an 8-dimensional linear data loader circuit 405. The example circuit 405 includes a linear cascade of BS gates with parameters $\alpha_i$. The loader circuit 405 is efficiently embedded before the pyramidal circuit 410. The input state in FIG. 4A is the first unary state (|10 ... 0⟩). The angles parameters $\alpha_0$, ..., $\alpha_{n-2}$ may be classically pre-computed from the input vector. Note that the data loader circuit 405 includes an X gate (not illustrated) that flips the first qubit from the |0⟩ state to the |1⟩ state.

Generally, a data loader circuit starts in the all |0⟩ state and flips a first qubit using an X gate, in order to obtain the unary state |10 ... 0⟩ (e.g., as shown on FIG. 4A). Then a cascade of BS gates allow to create the state |x⟩ using a set of n−1 angles $\alpha_0$, ..., $\alpha_{n-2}$. Using Eq.(1), angles are chosen such that, after the first BS gate of the loader, the qubits would be in the state $x_0$|100 ... ⟩+sin($\alpha_0$)|010 ... ⟩ and after the second one in the state $x_0|100\ldots\rangle + x_1|010\ldots\rangle + \sin(\alpha_0)\sin(\alpha_1)|001\ldots\rangle$ and so on, until obtaining $|x\rangle$ as in Eq.(2). To this end, classical preprocessing may be performed to compute recursively the n−1 loading angles, in time O(n):

$$\begin{cases} \alpha_0 = \arccos(x_0) \\ \alpha_1 = \arccos\left(\dfrac{x_1}{\sin(\alpha_0)}\right) \\ \alpha_2 = \arccos\left(\dfrac{x_2}{\sin(\alpha_0)\sin(\alpha_1)}\right) \\ \ldots \end{cases} \quad (4)$$

The ability of loading data in such a way uses the assumption that each input vector is normalized, i.e. $\|x\|_2=1$. This normalization constraint could seem arbitrary and impact the ability to learn from the data. In fact, in the case of orthogonal neural network, this normalization shouldn't degrade the training because orthogonal weight matrices are in fact orthonormal and thus norm-preserving. Hence, changing the norm of the input vector, by dividing each component by $\|x\|_2$, in both classical and quantum setting is not a problem. The normalization would impose that each input has the same norm, or the same "luminosity" in the context of images, which can be helpful or harmful depending on the use case.

2.4 Additional Information on Data Loader Circuits

The first step of the data loading, given access to a classical data point (e.g., $x=(x_1, x_2, \ldots, x_d)$), is to pre-process the classical data efficiently, e.g., spending only O(d) total time (where the logarithmic factors are hidden), in order to create a set of parameters (e.g., $\theta=(\theta_1, \theta_2, \ldots, \theta_{d-1})$), that will be the parameters of the (d−1) two-qubit gates used in our quantum data loader circuit. During pre-processing, we may also keep track of the norms of the vectors. Note that these angles parameters are different depending on which data loader circuit is used.

We may use three different types of data loader circuits. FIGS. 4B-D illustrate these different data loader circuits for eight qubits. Specifically, FIG. 4B is a diagram of a "parallel loader circuit," FIG. 4C is a diagram of another diagonal loader circuit, and FIG. 4D is a diagram of a "semi-diagonal loader circuit." The X in each figure corresponds to the single-qubit Pauli X gate, while vertical lines represent the two-qubit BS gates.

The shallowest data loader circuit is the parallel data loader circuit (example in FIG. 4B), which loads d-dimensional data points using d qubits and d−1 BS gates. The parallel loader circuit has a depth of log(d)+1. While this data loader may have the smallest depth of the three different types of data loaders, it may also have the highest qubit connectivity. In other words, the circuit diagrams of parallel data loaders may have the greatest number of BS gates that are applied to non-nearest neighbor qubits.

An example method for constructing a parallel data loader circuit is the following. We start with all qubits initialized to the 0 state. In the first step, we apply an X gate on the first qubit. Then, the circuit is constructed by adding BS gates in layers, using the angles θ we constructed before. The first layer has 1 BS gate, the second layer has 2 BS gates, the third layer has 4 BS gates, until the log(d)-th layer that has d/2 gates. The qubits to which the gates are added follow a tree structure (e.g., a binary tree structure). In the first layer we have one BS gate between qubits (0,d/2) with angle $\theta_1$, in the second layer we have two BS gates between (0,d/4) with angle $\theta_2$ and (d/2,3d/4) with angle $\theta_3$, in the third layer there are four BS gates between qubits (0,d/8) with angle $\theta_4$, (d/4,3n/8) with angle $\theta_5$, (d/2,5d/8) with angle $\theta_6$, (3d/4,7d/8) with angle $\theta_7$, and so forth for the other layers. Parallel data loader circuits are also described in U.S. patent application Ser. No. 16/986,553 filed on Aug. 6, 2020, which is incorporated herein by reference.

The two other types of data loader circuits may have worse asymptotic depth (in other words, larger depths) but fewer BS gates that are applied to non-nearest neighbor quits.

The diagonal data loader uses d qubits and d−1 BS gates that may be applied to nearest neighboring qubits in the circuit diagram (e.g., see FIG. 4C). However, diagonal data loaders may have a circuit depth of d−1.

The semi-diagonal loader similarly uses d qubits and d−1 BS gates that may be applied to nearest neighboring qubits in the circuit diagram (e.g., see FIG. 4D). However, the semi-diagonal loader may have a depth of d/2. As illustrated in FIG. 4D, the semi-diagonal loader is similar to the diagonal loader except it starts from the middle qubit (instead of top or bottom qubit).

To determine which data loader circuit to use, we typically choose a data loader that increases the depth the least. With the pyramid circuit, for instance, the diagonal data loader circuit fits well, despite its large intrinsic depth (as described above). However, for other neural network layer circuits, this may not be the case. When there no such trick, the parallel loader is typically preferred because of its small depth.

3. OrthoNNs Feedforward Pass 3.1 Brief Description of Feedforward Pass

Given the angles, one can find the unique matrix and given the matrix one can uniquely specify the angles. To get an entry of the weight matrix for a layer, we take the sum of expressions from (e.g., all) possible paths from qubit to i using the following rules:

(A) If we pass by any gate with angle $\theta_n$, we multiply with $\cos(\theta_n)$.

(B) If we go up on any gate with angle $\theta_n$, we multiply with $-\sin(\theta_n)$.

(C) If we go down on any gate with angle θn, we multiply with $\sin(\theta_n)$.

Calculating the weight matrix in this or similar manner can be done efficiently using various techniques like recursion, dynamic programming, or applying the gates to the weight matrix in the appropriate order since this is similar to the implementation of the BS gates described above.

Figure 15:
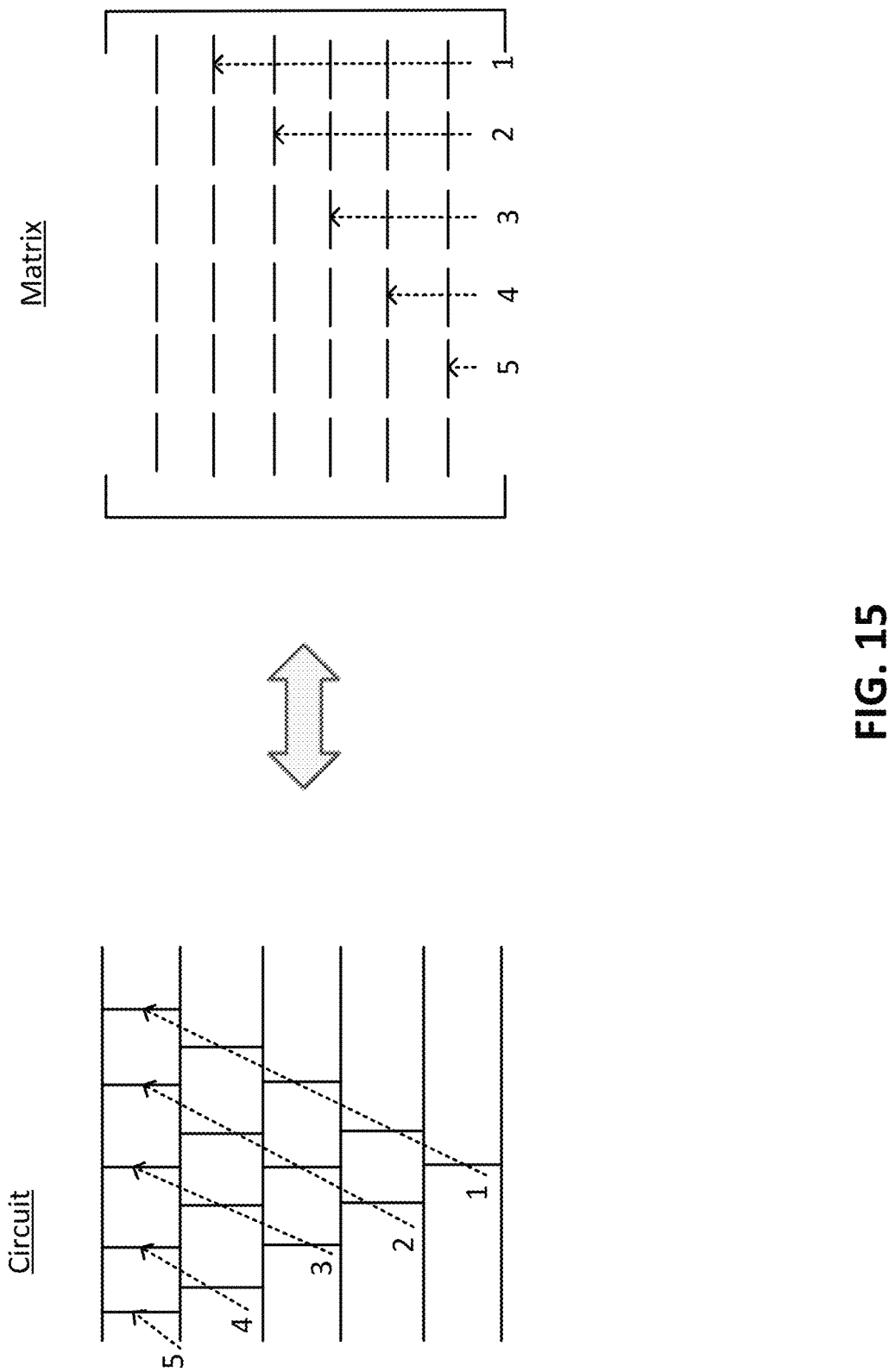
FIG. 15 is a diagram that illustrates a matrix to angles conversion traversal for a 6×6 layer.

To obtain the angles from a given orthogonal matrix, we traverse the orthogonal matrix column by column from right to left and going from bottom to top (until before the anti-diagonal element) in each column. For example, see FIG. 15B. Since, we know the expression in terms of sines and cosines of a subset of angles for each matrix element, we can equate it with the corresponding actual value in the orthogonal matrix. Traversing it in this manner leads to equations with only one unknown angle which can be, therefore, retrieved.

We can combine such layers sequentially to create a larger quantum neural network. Between each layer, one can measure the quantum states, apply a non-linearity, and then upload the data to the next layer. For example, see FIGS. 14A-14B (further described below).

We can also add another quantum layer before or after the pyramidal structure to construct different architectures that encompass our construction.

Figure 5:
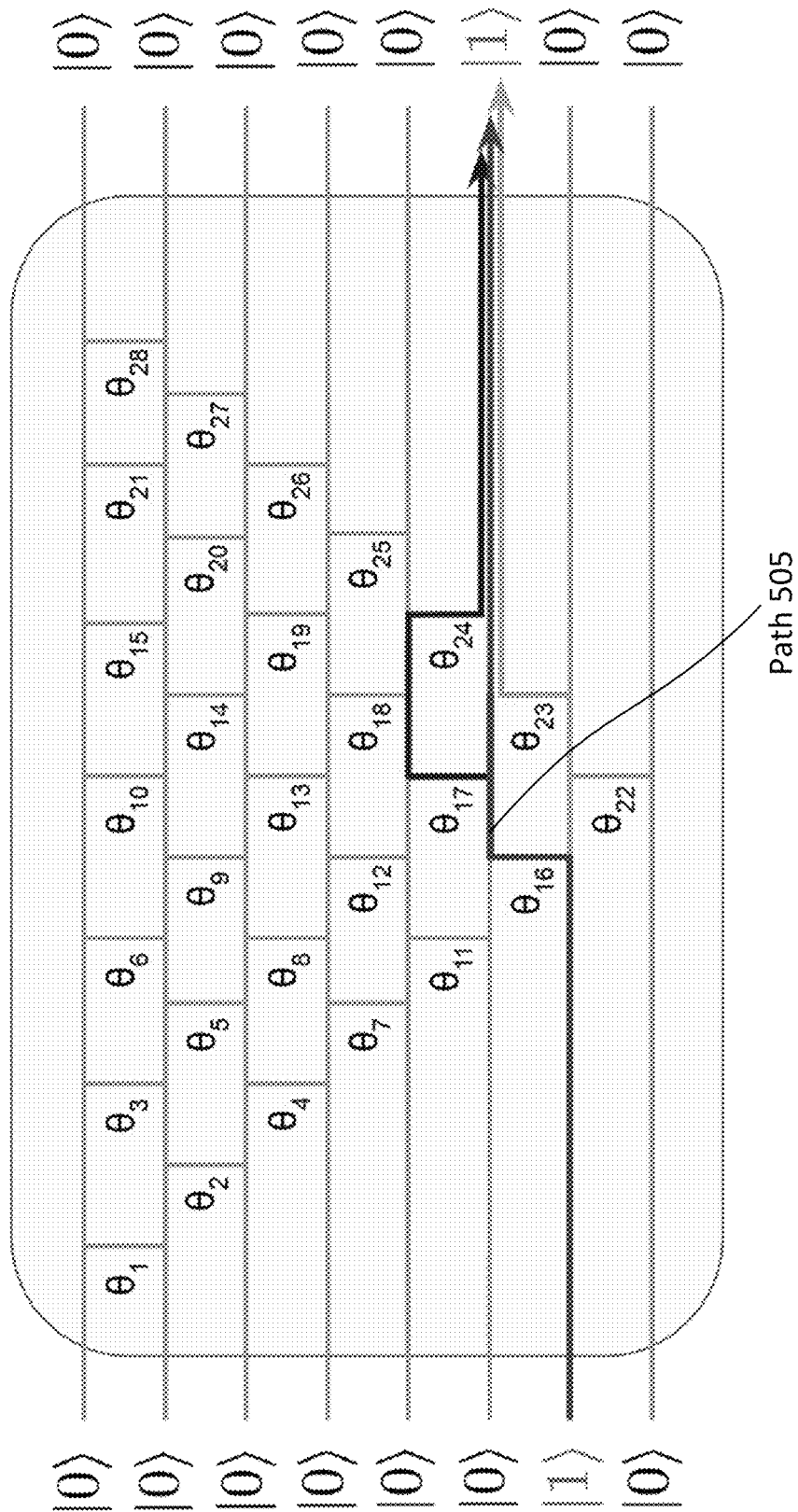
FIG. 5 is a diagram that illustrates paths from a $7^{th}$ unary state to a $6^{th}$ unary state on an 8×8 quantum pyramidal circuit.

To load the data for each layer, we can use the construction in FIG. 5 or any similar data loading procedure. The angles are computed from the input vector in linear time in the dimension of the vector.

3.2 Detailed Description of Feedforward Pass

The following paragraphs further describe subject matter in Section 3.1 above.

In this section we detail the effect of the quantum pyramidal circuit on an input encoded in a unary basis, as in Eq.(2). We will also see in the end how to simulate this quantum circuit classically with a small overhead and thus be able to provide a fully classical scheme.

Let's first consider one pure unary input, where only the qubit j is in state $|1\rangle$ (e.g. $|00000010\rangle$). This unary input is transformed into a superposition of unary states, each with an amplitude. If we consider again only one of these possible unary outputs, where only the qubit i is in state $|1\rangle$, its amplitude can be interpreted as a conditional amplitude to transfer the $|1\rangle$ from qubit j to qubit i. Intuitively, this value is the sum of the quantum amplitudes associated to each possible path that connects the qubit j to qubit i, as shown in FIG. 5.

Using this image of connectivity between input and output qubits, we can construct a matrix $W \in \mathbb{R}^{n \times n}$, where each element $W_{ij}$ is the overall conditional amplitude to transfer the $|1\rangle$ from qubit j to qubit i.

FIG. 5 is a diagram that illustrates the three possible paths from the $7^{th}$ unary state to the $6^{th}$ unary state on a quantum pyramidal circuit to implement an 8×8 neural network layer. FIG. 5 shows an example where exactly three paths can be taken to map the input qubit j=6 (the $7^{th}$ unary state) to the qubit i=5 (the $6^{th}$ unary state). Each path comes with a certain amplitude. For instance, path 505 moves up at the first gate, and then stays put in the next three gates, with a resulting amplitude of $-s(\theta_{16})c(\theta_{17})c(\theta_{23})c(\theta_{24})$. The sum of the amplitudes of all possible paths give us the element $W_{56}$ of the matrix W (where, for simplicity, $s(\theta)$ and $c(\theta)$ respectively stand for $\sin(\theta)$ and $\cos(\theta)$):

$$W_{56} = -s(\theta_{16})c(\theta_{22})s(\theta_{23}) - s(\theta_{16})c(\theta_{17})c(\theta_{23})c(\theta_{24}) + s(\theta_{16})s(\theta_{17})c(\theta_{18})s(\theta_{24}) \quad (5)$$

In fact, the n×n matrix W can be seen as the unitary matrix of our quantum circuit if we solely consider the unary basis, which is specified by the parameters of the quantum gates. A unitary is a complex unitary matrix, but in our case, with only real operations, the matrix is orthogonal. This proves the correspondence between any matrix W and the pyramidal quantum circuit.

The full unitary $U_W$ in the Hilbert Space of our n-qubit quantum circuit is a $2^n \times 2^n$ matrix with the n×n matrix W embedded in it as a submatrix on the unary basis. This is achieved by loading the data as unary states and by using only BS gates that keep the number of 0s and 1s constant.

For instance, as shown in FIG. 6, a 3-qubit pyramidal circuit is described as a unique 3×3 matrix, that can be verified to be orthogonal. More specifically, FIG. 6 illustrates an example of a 3-qubit pyramidal circuit and the equivalent orthogonal matrix. $c(\theta)$ and $s(\theta)$ respectively stand for $\cos(\theta)$ and $\sin(\theta)$.

In FIG. 5, we considered the case of single unary for both the input and output. But with actual data, as seen in Section 2.3, input and output states are in fact a superposition of unary states. Thanks to the linearity of quantum mechanics in absence of measurements, the previous descriptions remain valid and can be applied on a linear combination of unary states.

Let's consider an input vector $x \in \mathbb{R}^n$ encoded as a quantum state $|x\rangle = \Sigma_{i=0}^{n-1} x_i |e_i\rangle$ where $|e_i\rangle$ represents the $i^{th}$ unary state, as explained in Eq.(3). By definition of W, each unary $|e_j\rangle$ will undergo a proper evolution $|e_j\rangle \mapsto \Sigma_{j=0}^{n-1} W_{ij}|e_j\rangle$. This yields, by linearity, to the following mapping $$|x\rangle \mapsto \sum_{i,j} W_{ij} x_i |e_i\rangle \quad (6)$$

As explained above, our quantum circuit is equivalently described by the sparse unitary $U_W \in \mathbb{R}^{2^n \times 2^n}$ or in the unary basis by the matrix $W \in \mathbb{R}^{n \times n}$. This can be summarized with $$U_W|x\rangle = |Wx\rangle \quad (7)$$

We see from Eq.(6) and Eq.(7) that the output is in fact IA the unary encoding of the vector y=Wx, which is the output of a matrix multiplication between the n×n orthogonal matrix W and the input $x \in \mathbb{R}^n$. As expected, each element of y is given by $y_k = \Sigma_{i=0}^{n-1} W_{ik} x_i$. See FIGS. 7A-7C for a diagram representation of this mapping.

Figure 7A:
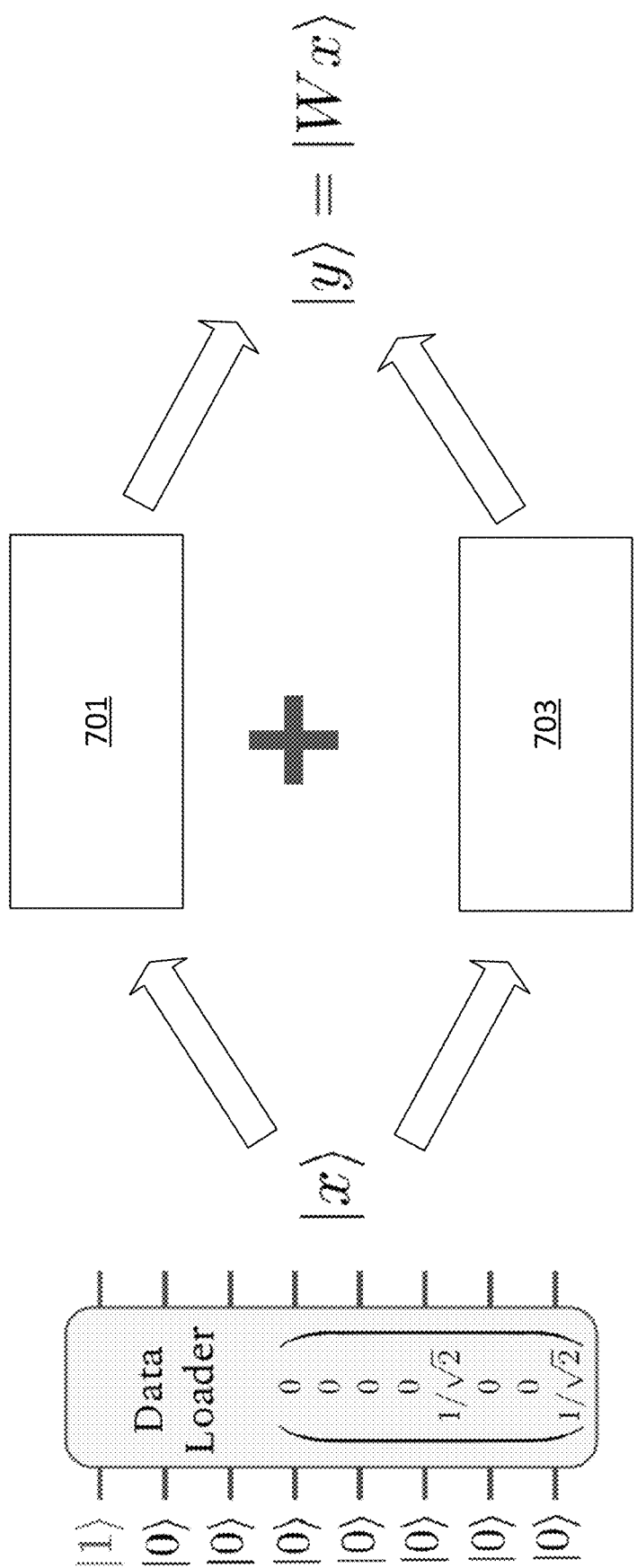
FIGS. 7A-7C are diagrams of a pyramidal circuit applied on a loaded vector x with two non-zero values.
Figure 7B:
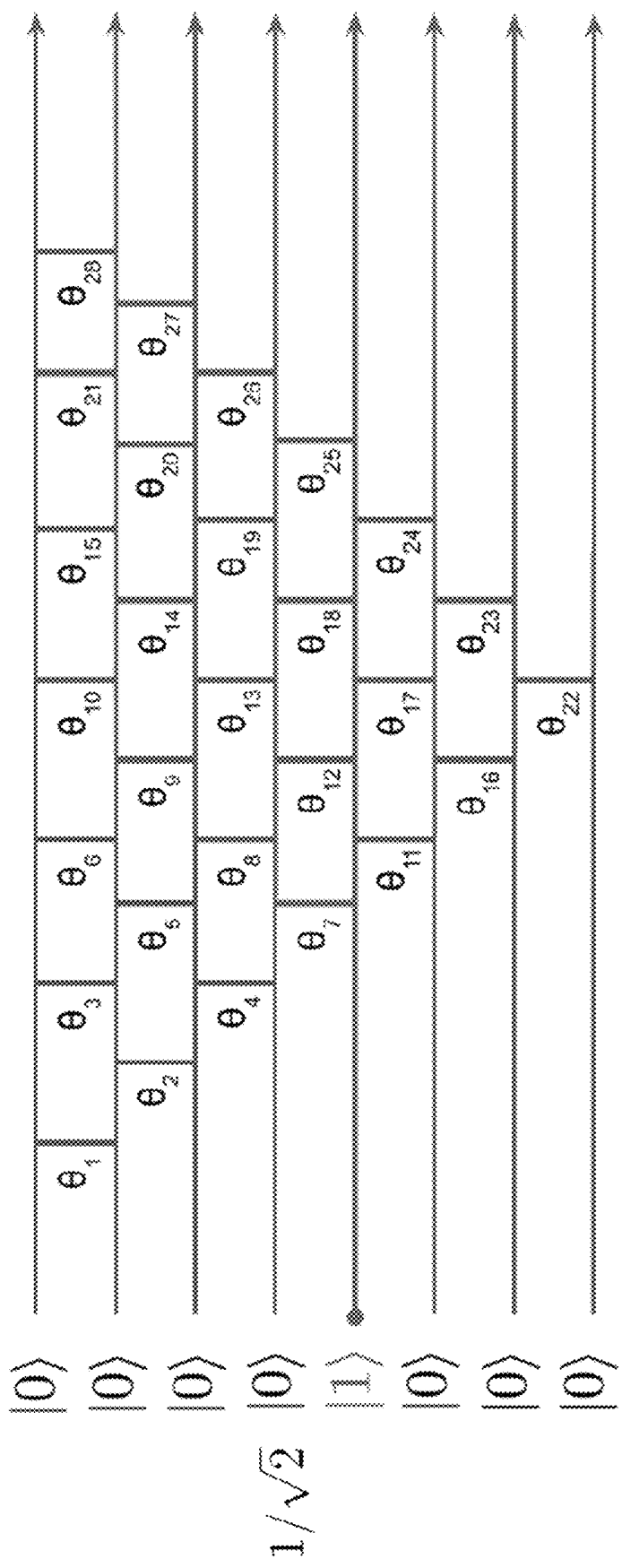
Figure 7C:
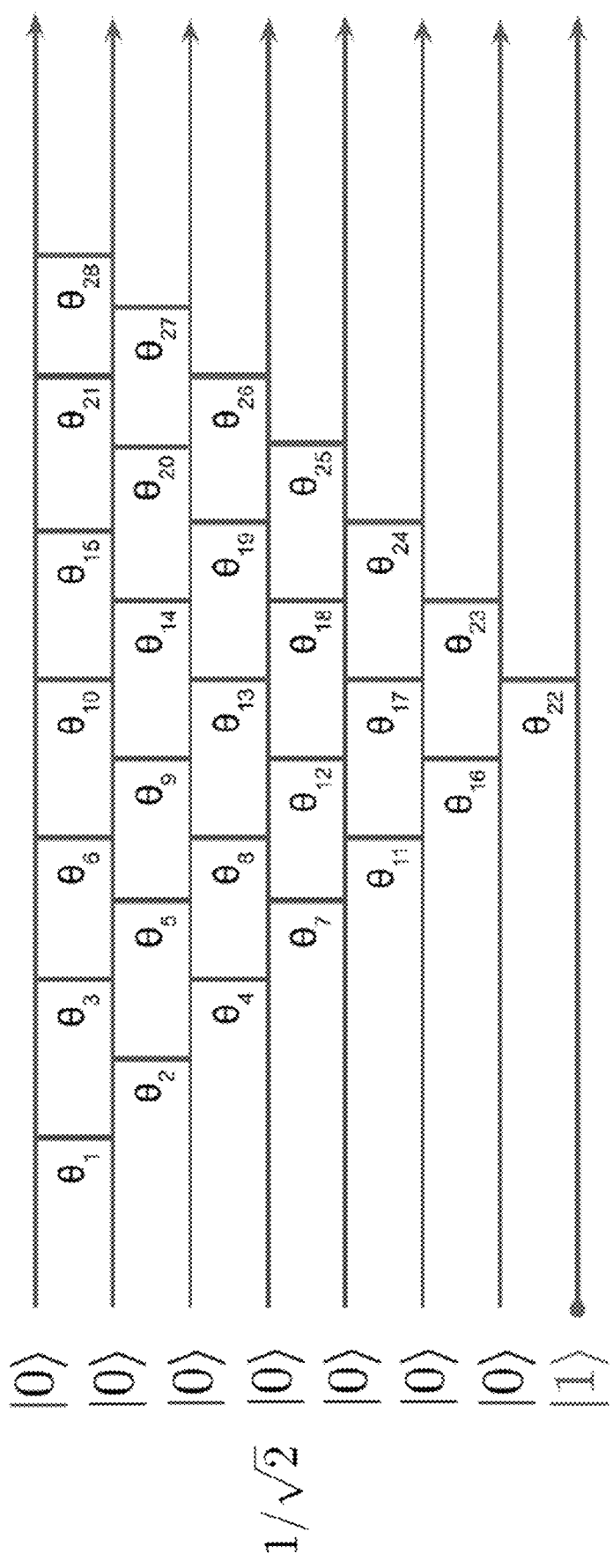

FIGS. 7A-7C are diagrams of a pyramidal circuit applied on a loaded vector x with two non-zero values. The output is the unary encoding of y=Wx where W is the corresponding orthogonal matrix associated with the circuit.

Therefore, for any given neural network's orthogonal layer, there may be a quantum pyramidal circuit that reproduces it. On the other hand, any quantum pyramidal circuit may be implementing an orthogonal layer of some sort.

Additional details concerning multi-layers branching, the tomography at the end of each layer, and the way to apply the non linearities are given in Section 10.

Thus, the quantum circuits proposed in this work can rightfully be called "quantum neural networks" even though this term has been employed to arbitrary variational circuits that present some conceptual similarities to neural networks. With our quantum pyramidal circuits, we control and understand the quantum mapping. It implements each layer and their non linearities, in a modular way. Our orthogonal quantum neural networks are also different regarding the training strategies (see Section 4 for details).

3.1 Classical Implementation

While the quantum pyramidal circuit is presented as the inspiration of the new methods for orthogonal neural networks, these quantum circuits can be simulated classically on a classical computing system with a small overhead, thus yielding classical methods for orthogonal neural networks.

The classical algorithm may be the simulation of the quantum pyramidal circuit, where each BS gate is replaced by a planar rotation between its two inputs.

Figure 8A:
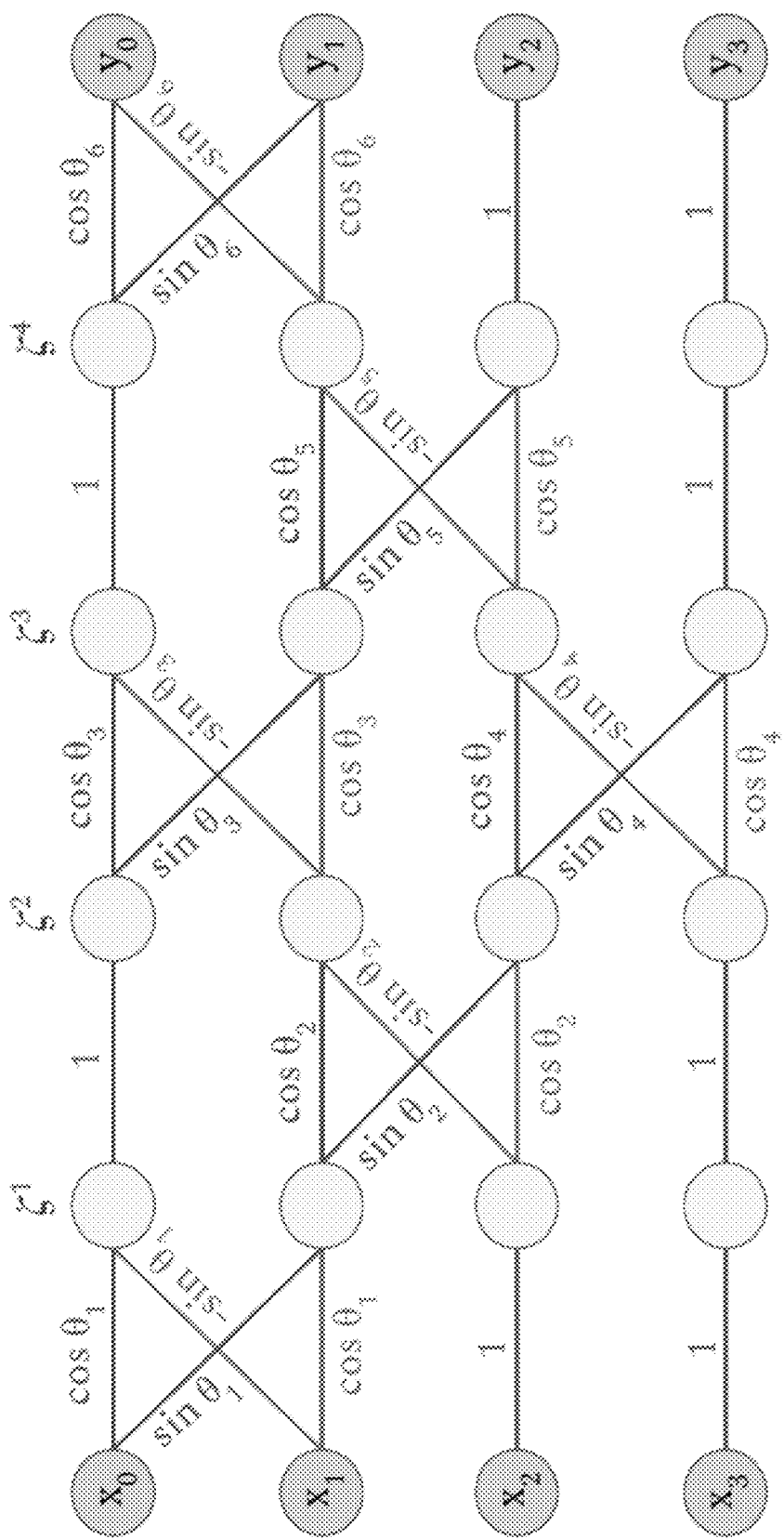
FIG. 8A is a diagram of a classical pyramidal circuit.
Figure 8B:
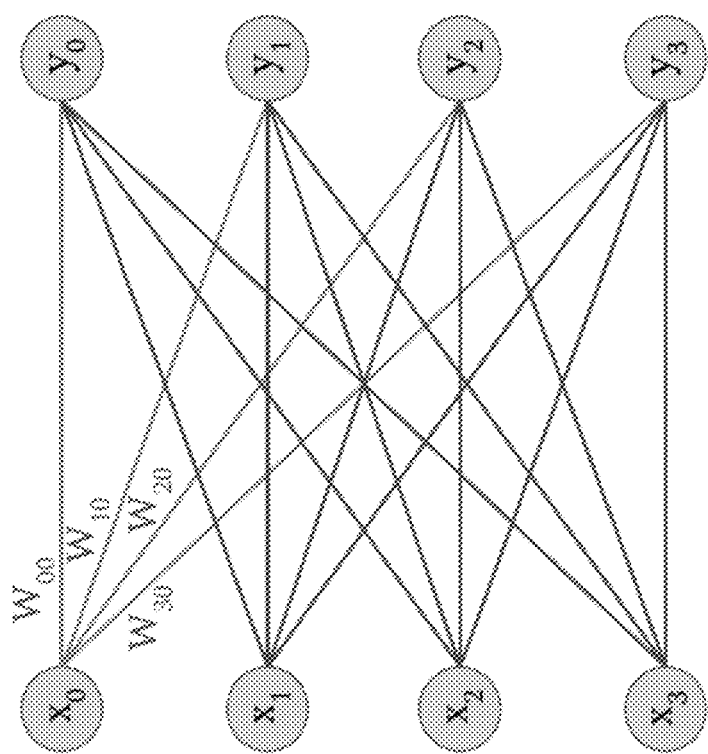
FIG. 8B is a diagram of a 4×4 layer of a neural network.

As shown in FIGS. 8A and 8B, we propose a similar classical pyramidal circuit, where each layer is constituted of $$\frac{n(n-1)}{2}$$

planar rotations, for a total of $$4 \times \frac{n(n-1)}{2} = O(n^2)$$

basic operations. Therefore, our single layer feedforward pass has the same complexity $O(n^2)$ as the usual matrix multiplication.

FIGS. 8A and 8B illustrate a classical representation of a single orthogonal layer on a 4×4 case (n=4) performing x ↦ y=Wx. The angles and the weights can be chosen such that our classical pyramidal circuit (FIG. 8A) and normal classical network (FIG. 8B) are equivalent. Each connecting line represent a scalar multiplication with the value indicated. On the classical pyramidal circuit (FIG. 8A), inner layers $\zeta^\lambda$ are displayed. A timestep corresponds to the lines in between two inner layers (see Section 4 for definitions).

One may still have an advantage performing the quantum circuit for inference, since the quantum circuit has depth O(n), instead of the $O(n^2)$ classical complexity of the matrix-vector multiplication. Nevertheless, as discussed see below, an advantage of our methods is that orthogonal weights matrices may be trained classically in time $O(n^2)$, instead of the previously best-known $O(n^3)$.

Described differently, inference on any input data can be done by sequentially applying each layer of the neural network. This is equivalent to multiplying the input by the generated orthogonal weight matrix. For an (n×n) layer, classically this takes time $O(n^2)$, the time to multiply an n×n matrix with an n-dimensional input vector, while the quantum circuit can perform this multiplication with O(n), steps since the depth of the quantum circuit is O(n).

4 OrthoNN Training: Angle's Gradient Estimation and Orthogonal Matrix Update

4.1 Brief Description of OrthoNN Training

For clarity, the remaining paragraphs of this section rephrase the above description.

Unlike in the classical feed-forward neural networks, gradient descent is performed on the BS gate angles directly and not on the weight matrix elements. This can be performed in multiple ways, such as batch gradient descent, stochastic gradient descent, etc. with a suitable learning rate. Mathematically, the update rule may be $$\theta_i \leftarrow \theta_i - \eta \frac{\partial C}{\partial \theta_i}$$

and can use different kinds of optimizers, like adam, rmsprop, yogi, etc.

To calculate the gradient of the cost function $C$ with respect to the angle of the B S gates, the error may be backpropagated not just over the layers of the network, but also over the mini layers (also referred to as "timesteps") which we denote by $\Delta^\ell$ and $\delta^\lambda$, respectively. $\Delta^\ell$ is the vector representing the error (gradient) with respect to the input $z^\ell$ to the layer, that is $$\Delta^\ell = \frac{\partial C}{\partial z^\ell} \cdot \delta^\lambda$$

is the vector representing the error (gradient) with respect to the input $\zeta^\lambda$ to the mini layer, that is $$\delta^\lambda = \frac{\partial C}{\partial \zeta^\lambda}.$$

The values of $\delta^\lambda$ may be calculated in the following way. $\delta^\lambda = (w^\lambda)^T \cdot \delta^{\lambda+1}$ for the weight matrix $(w^\lambda)^T$ of the layer index $\lambda$. For the last timestep, the first to be calculated, we have $\delta^{\lambda_{max}} = (w_{max}^\lambda)^T \cdot \Delta^\ell$.

For calculating the values of $\Delta^\ell$, the following equations can be used: $\Delta^{\ell-1} = \delta^0 \odot \sigma'(z^\ell)$ where $\sigma'$ is the derivative of the activation function $\sigma$.

For an BS gate with angle $\theta$ acting on the qubits i and i+1 in the mini layer $\lambda$, the gradient calculation can be derived to be the following expression:

$$\frac{\partial C}{\partial \theta} = \delta_i^{\lambda+1}(-\sin(\theta)\zeta_i^\lambda + \cos(\theta)\zeta_{i+1}^\lambda) + \delta_{i+1}^{\lambda+1}(-\cos(\theta)\zeta_i^\lambda - \sin(\theta)\zeta_{i+1}^\lambda),$$

which can be calculated in constant time. See also Equation 9 and FIG. 9.

On correct and efficient implementation of the above architecture and learning algorithm, we observe that the time taken for each layer to calculate and update the weights scales as O(nm) for a layer with n inputs and m outputs for each data point. This is as good as the classical non-orthogonal neural networks and provides the advantages offered by orthogonality. The forward pass (only inference), once the model is trained, gives a quadratic speedup as it scales as O(n) instead of O(nm) as in the classical case.

4.2 Detailed Description of OrthoNN Training

The following paragraphs further describe subject matter in Section 4.1 above.

An introduction and notation to backpropagation in a fully connected neural networks is described in Section 8.

When using quantum circuits to implement layers of a neural network, the parameters to update are no longer the individual elements of the weight matrices directly but may be the angles of the BS gates that give rise to these matrices. Thus, we design an adaptation of the backpropagation method to our setting based on the angles.

We start by introducing some notation for a single layer $\ell$ of the neural network, which is not explicit in the notation for simplicity. We assume we have as many output qubits as input qubits, but this can easily be extended to the rectangular case.

Figure 9:
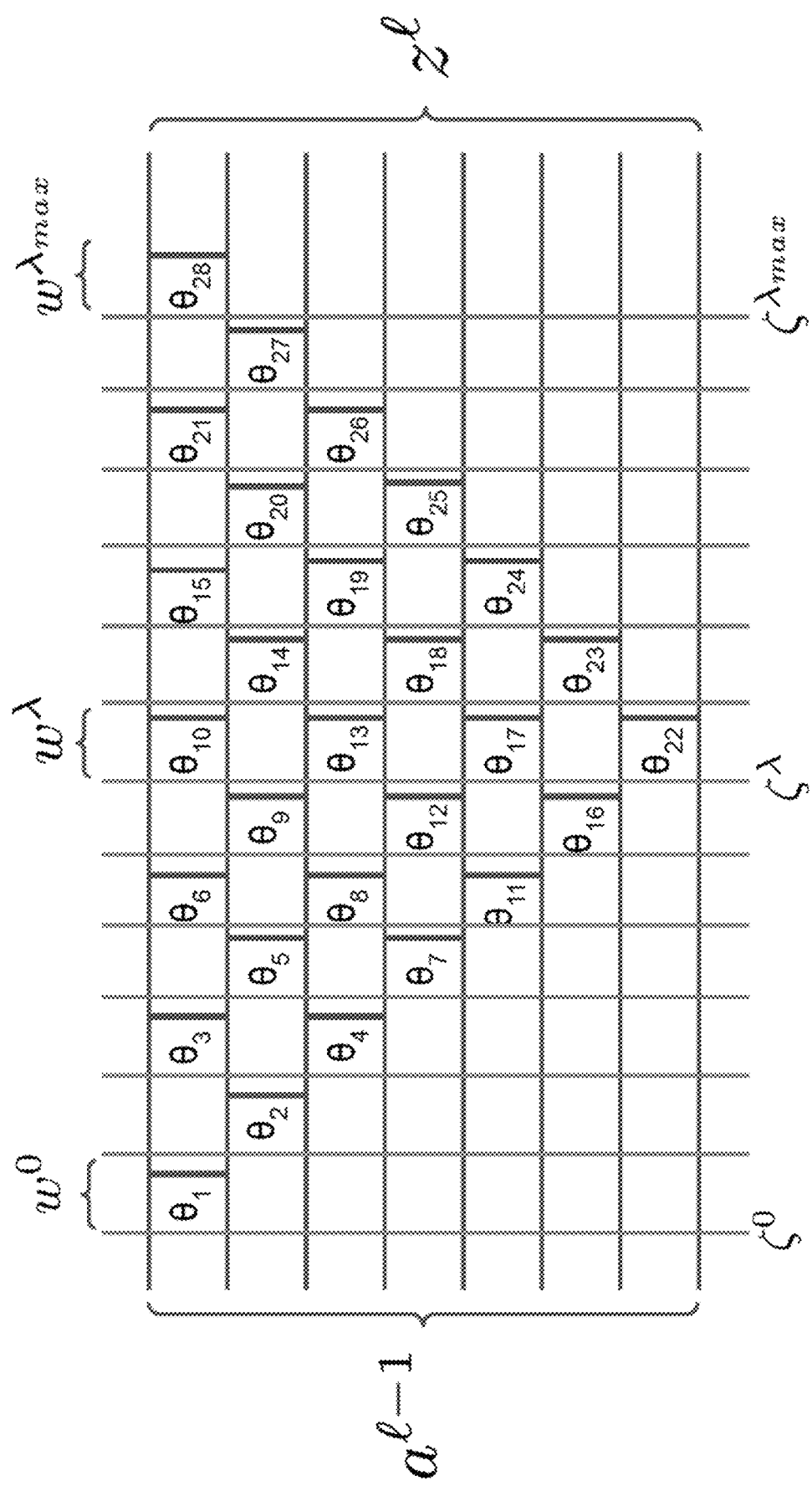
FIG. 9 is a diagram of a pyramid circuit that includes notation used for training.

We first introduce the notion of timesteps inside each neural network layer, which correspond to the computational steps in the pyramidal structure of the circuit (see FIG. 9). With the pyramid circuit, for n inputs, there are 2n−3 such timesteps, each one indexed by an integer $\lambda \in [0, \ldots, \lambda_{max}]$. Applying a timestep includes applying the matrix $w^\lambda$, which is made of all the BS gates aligned vertically at this timestep ($w^\lambda$ is the unitary in the unary basis). When a timestep is applied, the resulting state is a vector in the unary basis named inner layer and noted by $\zeta^\lambda$. This evolution can be written as $\zeta^{\lambda+1} = w^\lambda \cdot \zeta^\lambda$. We use this notation similar to the real layer $\ell$, with the weight matrix $w^\ell$ and the resulting vector $z^\ell$ (see Section 8).

In fact, we have the correspondences $\zeta^0 = a^{\ell-1}$ for the first inner layer, which is the input of the actual layer, and $z^\ell = w^{\lambda_{max}} \cdot \zeta^{\lambda_{max}}$ for the last timestep. We also have $w^\ell = w^{\lambda_{max}} \ldots w^1 w^0$. We use the same kind of notation for the backpropagation errors. At each timestep $\lambda$ we define an inner error $$\delta^\lambda = \frac{\partial C}{\partial \zeta^\lambda}.$$

This definition is similar to the layer error $$\Delta^\ell = \frac{\partial C}{\partial z^\ell}.$$

In fact, the same backpropagation formulas may be used, without non linearities, to retrieve each inner error vector $\delta^\lambda=(w^\lambda)^T \cdot \delta^{\lambda+1}$. In particular, for the last timestep, the first to be calculated, we have $\delta^{\lambda max}=(w_{max}^\lambda)^T \cdot \Delta^\ell$. Finally, we can retrieve the error at the previous layer $\ell-1$ using the correspondence $\Delta^{\ell-1}=\delta^0 \odot \sigma'(z^\ell)$, where $\odot$ symbolizes the Hadamard product, or entry-wise multiplication.

The reason for this breakdown into timesteps is the ability to efficiently obtain the gradient with respect to each angle. Let's consider one gate with angle $\theta_i$, acting at the timestep $\lambda$ on qubits i and i+1. We decompose the gradient $$\frac{\partial C}{\partial \theta_i}$$

using each component, indexed by the integer k, of the inner layer and inner error vectors:

$$\frac{\partial C}{\partial \theta_i} = \sum_k \frac{\partial C}{\partial \zeta_k^{\lambda+1}} \frac{\partial \zeta_k^{\lambda+1}}{\partial \theta_i} = \sum_k \delta_k^{\lambda+1} \frac{\partial (w_k^\lambda \cdot \zeta^\lambda)}{\partial \theta_i} \quad (8)$$

Since timestep $\lambda$ is only composed of separated BS gates, the matrix $w^\lambda$ includes in diagonally arranged 2×2 block submatrices given in Eq. (1). Only one of these submatrices depends on the angle $\theta$ considered here, at the position i and i+1 in the matrix. We can thus rewrite the above gradient as:

$$\frac{\partial C}{\partial \theta_i} = \delta_i^{\lambda+1}(-\sin(\theta_i)\zeta_i^\lambda + \cos(\theta_i)\zeta_{i+1}^\lambda) + \delta_{i+1}^{\lambda+1}(-\cos(\theta_i)\zeta_i^\lambda - \sin(\theta_i)\zeta_{i+1}^\lambda) \quad (9)$$

Therefore, we have shown a way to compute each angle gradient: during the feedforward pass, sequentially apply each of the 2n−3=O(n) timesteps and store the resulting vectors (the inner layers $\zeta^\lambda$). During the backpropagation, obtain the inner errors by applying the timesteps in reverse. To do this, we "back-propagate" the errors by calculating first the $\delta^\lambda$ and then $\delta^\lambda$, from $\lambda_{max}$ to 0). Afterwards, a gradient descent method may be used on each angle $\theta_i$, while preserving the orthogonality of the overall equivalent weight matrix:

$$\theta_i \leftarrow \theta_i - \eta \frac{\partial C}{\partial \theta_i}.$$

An interesting aspect of this gradient descent is the fact that the optimization is performed in the angle landscape, and not on the equivalent weight landscape. These landscapes can potentially be different and hence the optimization can produce different models.

As one can see from the above description, this is a classical algorithm to obtain the angle's gradients, which allows the OrthoNN to be trained efficiently classically while preserving the strict orthogonality.

To obtain the angle's gradient, 2n−3 inner layers $\zeta^\lambda$ may be stored during the feedforward pass. Next, given the error at the following layer, a backward loop on each timestep may be performed (see FIG. 9). At each timestep, the gradient for each angle parameter may be determined by applying Eq. (9). This uses O(1) operations for each angle. Since there are at most n/2 angles per timesteps for a pyramid circuit, estimating gradients has a complexity of O($n^2$). After each timestep, the next inner error $\delta^{\lambda-1}$ is computed as well, using at most 4n/2 operations.

Thus, this classical algorithm allows the gradients of the n(n−1)/2 angles to be computed in O($n^2$), in order to perform a gradient descent respecting the strict orthogonality of the weight matrix. This is considerably faster than previous methods based on Singular Value Decomposition methods and provides a training method which is as fast as for normal neural networks (e.g., see Table 1), while providing the extra property of orthogonality.

5. Numerical Experiments

We performed basic numerical experiments to verify the learning abilities of the pyramidal circuit using a classical simulation. In these experiments, we use a dataset of handwritten digits (in this case, the standard MNIST dataset) to compare our pyramidal OrthoNN with an SVB algorithm.

Figure 10:
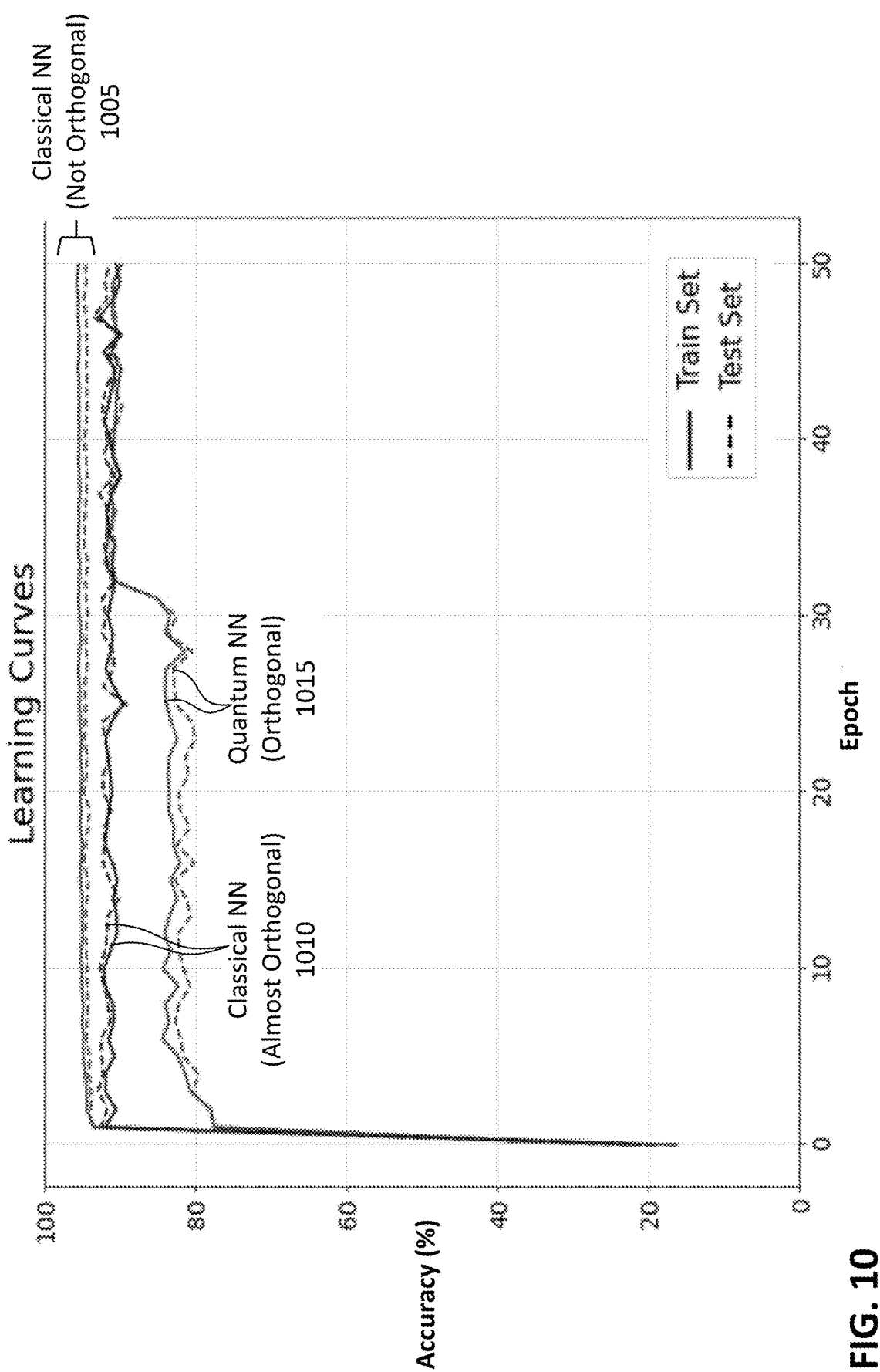
FIG. 10 is a plot of numerical experiments.

FIG. 10 is a graph of the numerical experiments. The graph compares a standard neural network 1005 with an approximated OrthoNN 1010 (using a SVB algorithm) and our pyramidal OrthoNNs 1015. The graph shows that the training of the classical NN 1005, the classical almost-orthogonal NN 1010, and the pyramidal orthogonal-NN 1015 all lead to a good and equivalent learning accuracy. The x-axis is the number of epochs (i.e., the number of training steps). The y-axis is the accuracy. The unbroken lines are the accuracy of the "Train set," which is the set of data used to update the weights/parameters. The dashed lines are the accuracy of the "Test set," which is the set of data that were not seen during the training. The Test set data verifies that the model is not 'overfitting' to the training data. The reason the pyramid ortho-NN plot 10105 converges a bit later is unknown, but this does not seem to be a fundamental characteristic. Overall, the plots in FIG. 10 show that our proposal appears to be valid in at least small-scale classical simulations.

6. Significance

This disclosure describes training methods for orthogonal neural networks (OrthoNNs) that run in quadratic time, which is a significant improvement over previous methods based on Singular Value Decomposition.

One idea of our methods is to replace the usual weights and orthogonal matrices by an equivalent pyramidal circuit made of two-dimensional rotations. Each rotation is parametrizable by an angle, and the gradient descent takes place in the angle's optimization landscape. This unique type of gradient backpropagation may ensure a perfect orthogonality of the weights matrices while improving the running time compared to previous works. Moreover, both classical and quantum methods may be used for inference, where the forward pass on a near term quantum computing system may provide a provable advantage in the running time. This disclosure also expands the field of quantum deep learning by introducing new tools, concepts, and equivalences with classical deep learning theory.

7. Description of Orthogonal Neural Networks

The idea behind Orthogonal Neural Networks (OrthoNNs) is to add constraint to the weight matrices corresponding to the layers of a neural network. Imposing orthogonality to these matrices have theoretical and practical benefits in the generalization error. Orthogonality may ensure a low weights redundancy and may preserve the magnitude of the weight matrix's eigenvalues to avoid vanishing gradients. In terms of complexity, for a single layer, the feedforward pass of an OrthoNN is a matrix multiplication, hence has a running time of $O(n^2)$ if n×n is the size of the orthogonal matrix.

A difficulty of OrthoNNs is to preserve the orthogonality of the matrices while updating them during gradient descent. Several algorithms have been proposed to this end, but they all point that pure orthogonality is computationally hard to conserve.

As used herein, an orthogonal matrix refers to a real square matrix whose columns and rows are orthonormal vectors. One way to express this is $Q^TQ=QQ^T=I$, where $Q^T$ is the transpose of Q and I is the identity matrix.

8. General Description of Backpropagation for Neural Networks

Backpropagation in a fully connected neural network is an efficient procedure to update the weight matrix at each layer. At layer $\ell$, we note its weight matrices $w^\ell$ and biases $b^\ell$. Each layer is followed by a nonlinear function a, and can therefore be written as $$a^\ell = \sigma(W^\ell \cdot a^{\ell-1} + b^\ell) = \sigma(z^\ell) \quad (10)$$

After the last layer, one can defined a cost function C that compares the output to the ground truth. The goal is to calculate the gradient of C with respect to each weight and bias, namely $$\frac{\partial C}{\partial W^\ell} \text{ and } \frac{\partial C}{\partial b^\ell}.$$

In the backpropagation, the method calculates these gradients for the last layer, then propagates back to the first layer.

The error vector at layer $\ell$ may be defined by $$\Delta^\ell = \frac{\partial C}{\partial W^\ell}.$$

One can show the backward recursive relation $\Delta^\ell = (W^{\ell+1})^T \cdot \Delta^{\ell+1} \odot \sigma'(z^\ell)$, where $\odot$ symbolizes the Hadamard product, or entry-wise multiplication. Note that the previous computation applies the layer (apply matrix multiplication) in reverse. We can then show that each element of the weight gradient matrix at layer $\Delta^\ell$ is given by $$\frac{\partial C}{\partial W^\ell_{jk}} = \Delta^\ell_j \cdot a^{\ell-1}_1.$$

Similarly, the gradient with respect to the biases is defined as $$\frac{\partial C}{\partial b^\ell_j} = \Delta^\ell_j.$$

Once these gradients are computed, the parameters may be updated using the gradient descent rule, with learning rate $\eta$ (note that $\eta$ may be the same or different than $\eta$ used in Section 4):

$$W^\ell_{jk} \leftarrow W^\ell_{jk} - \eta \frac{\partial C}{\partial W^\ell_{jk}} \quad ; \quad b^\ell_j \leftarrow b^\ell_j - \eta \frac{\partial C}{\partial b^\ell_j} \quad (11)$$

9. Preliminaries in Quantum Computing

This section provides a succinct quantum information background that may be helpful for this work.

9.1 Qubits

In classical computing, a bit can be either 0 or 1. With a quantum information perspective, a quantum bit or qubit can be in state $|0\rangle$, $|1\rangle$. We use the braket notation $|\cdot\rangle$ to specify the quantum nature of the bit. The qubits can be in superposition of both states $\alpha|0\rangle + \beta|1\rangle$ where $\alpha, \beta \in \mathbb{C}$ such that $|\alpha|^2 + |\beta|^2 = 1$. The coefficients $\alpha$ and $\beta$ are called amplitudes. The probabilities of observing either 0 or 1 when measuring the qubit are linked to the amplitudes:

$$p(0) = |\alpha|^2, p(1) = |\beta|^2 \quad (12)$$

As quantum physics teaches us, any superposition is possible before the measurement, which gives special abilities in terms of computation. With a n qubits, $2^n$ possible binary combinations (e.g. $|01 \ldots 1001\rangle$) can exist simultaneously, each with its own amplitude.

An n qubit system can be represented as a normalized vector in a $2^n$ dimensional Hilbert space. A multiple qubit system is called a quantum register. If $|p\rangle$ and $|q\rangle$ are two quantum states or quantum registers, the whole system can be represented as a tensor product $|p\rangle \otimes |q\rangle$, also written as $|p\rangle |q\rangle$ or $|p, q\rangle$.

9.2 Quantum Computation

As logical gates in classical circuits, qubits or quantum registers are processed using quantum gates. A gate is a unitary mapping in the Hilbert space, preserving the unit norm of the quantum state vector. Therefore, a quantum gate acting on n qubits is a matrix $U \in \mathbb{C}^{2^n}$ such that $UU^\dagger = U^\dagger U = I$, with $U^\dagger$ being the adjoint, or conjugate transpose, of U.

Common single qubit gates includes the Hadamard gate $$\frac{1}{\sqrt{2}}\begin{pmatrix} 1 & 1 \\ 1 & -1 \end{pmatrix}$$

that maps $$|0\rangle \mapsto \frac{1}{\sqrt{2}}(|0\rangle + |1\rangle) \text{ and } |1\rangle \mapsto \frac{1}{\sqrt{2}}(|0\rangle - |1\rangle),$$

creating the quantum superposition, the NOT gate $$\begin{pmatrix} 0 & 1 \\ 1 & 0 \end{pmatrix}$$

that permutes $|0\rangle$ and $|1\rangle$, or $R_y$ rotation gate parametrized by an angle $\theta$, given by $$\begin{pmatrix} \cos(\theta/2) & -\sin(\theta/2) \\ \sin(\theta/2) & \cos(\theta/2) \end{pmatrix}.$$

Common two-qubits gates includes the CNOT gate $$\begin{pmatrix} 1 & 0 & 0 & 0 \\ 0 & 1 & 0 & 0 \\ 0 & 0 & 0 & 1 \\ 0 & 0 & 1 & 0 \end{pmatrix}$$

which is a NOT gate applied on the second qubit only if the first one is in state $|1\rangle$, or similarly the CZ gate $$\begin{pmatrix} 1 & 0 & 0 & 0 \\ 0 & 1 & 0 & 0 \\ 0 & 0 & 0 & 1 \\ 0 & 0 & 0 & -1 \end{pmatrix}.$$

Figure 11:
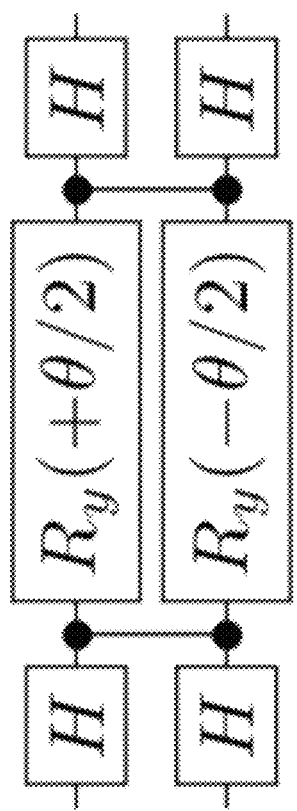
FIG. 11 is a diagram of a quantum circuit configured to implement a BS gate.

In this work, we use the BS gate. In some embodiments, this gate can be implemented either as a native gate, known as FSIM, or using four Hadamard gates, two $R_y$ rotation gates, and two two-qubits CZ gates. An example of this circuit is illustrated in FIG. 11

One advantage of quantum gates is their ability to be applied to a superposition of inputs. Indeed, given a gate U such that $U|x\rangle \mapsto |f(x)\rangle$, it can be applied to all possible combinations of x at once $$U\left(\frac{1}{C}\sum_k |x\rangle\right) \mapsto \frac{1}{C}\sum_k |f(x)\rangle.$$

10. Additional Details on the Quantum Pyramidal Circuit

10.1 Tomography and Error Mitigation

As shown in FIGS. 7A-7C, when using the quantum circuit, the output is a quantum state $|y\rangle = |Wx\rangle$. As often in quantum machine learning, it may be important to go all the way and consider the cost of retrieving classical outputs, using a procedure called tomography. In our case, this may be important since between each layer, the quantum output is converted into a classical one in order to apply a nonlinear function, and then reloaded for the next layer.

10.1.1 Error Mitigation

Before detailing the tomography procedure, it is interesting to notice that with our restriction to unary states, a strong benefit appears for error mitigation purposes. Indeed, since we may expect to obtain only quantum superposition of unary states at every layer, measurements may be post processed to discard measurements that include non-unary states (i.e., states with more than one qubit in state $|1\rangle$, or the ground state). The most expected error is a bit flip between $|1\rangle$ and $|0\rangle$. The case where two bit flips happened, which would pass through our error mitigation, is even less probable.

10.1.2 Tomography

Retrieving the amplitudes of a quantum state comes at cost of multiple measurements, which requires to run the circuit multiples times, hence adding a multiplicative overhead in the running time. A finite number of samples is also a source of approximation in the final result. In this work, we allow for $\ell_\infty$ errors. The $\ell_\infty$ tomography on a quantum state $|y\rangle$ with unary encoding on n qubits may require $O(\log(n)/\delta^2)$ measurements, where $\delta>0$ is the error threshold allowed. For each $j \in [n]$, $[y_j]$ is obtained with an absolute error $\delta$, and if $[y_j]<\delta$, it will most probably not be measured, hence set to 0. In practice, one would perform as many measurements as it is convenient during the experiment and deduce the equivalent precision $\delta$ from the number of measurements made.

In some embodiments, the sign of each component of the vector may be determined. Indeed, since we measure probabilities that are the square module of the quantum amplitudes, the sign may not be readily apparent. In the case of neural network, it may be important to obtain the sign of the layer's components in order to apply certain types of non linearities. For instance, the ReLu activation function is often used to set all negative components to 0.

Figure 12A:
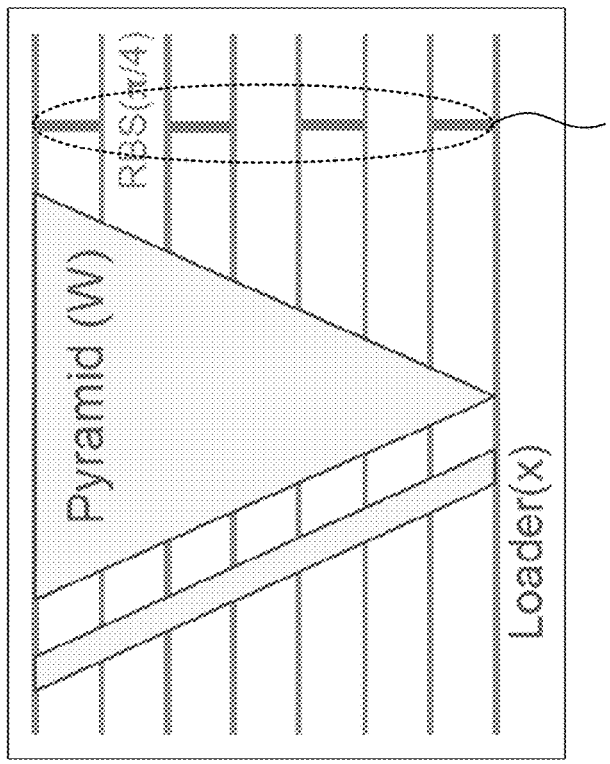
FIGS. 12A-12C are diagrams of quantum circuits used to obtain the signs of a vector's components.
Figure 12B:
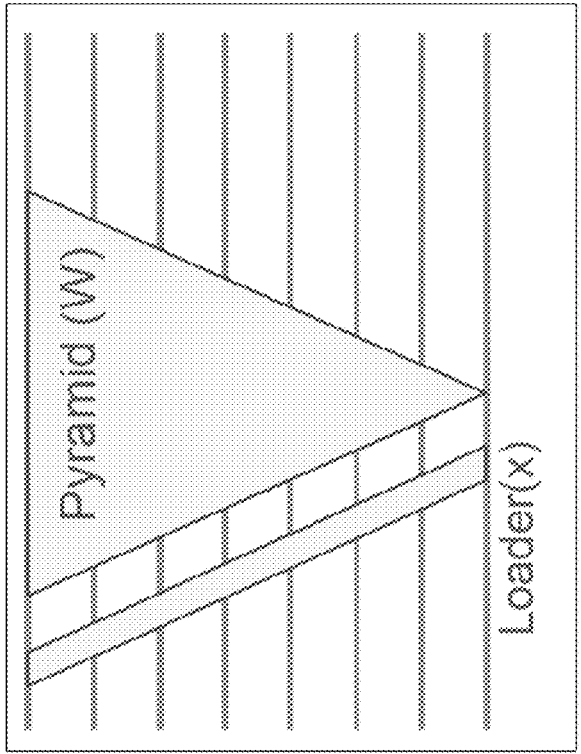
Figure 12C:
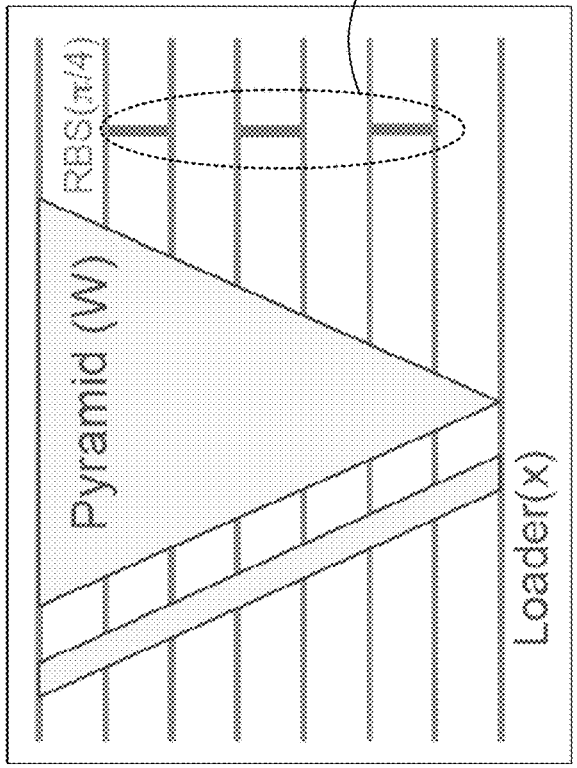

In FIGS. 12A-12C, we propose specific enhancements (e.g., additional circuits) to our pyramid circuit to obtain the signs of the vector's components at low cost. Specifically, FIGS. 12A-C illustrate tomography procedures to retrieve the value and the sign of each component of the resulting vector $|y\rangle = |Wx\rangle$. FIG. 12A illustrates the pyramid circuit previously described. FIGS. 12B and 12C illustrate the pyramid circuit with additional circuits. Specifically, the FIGS. 12B and 12C include additional BS gates with angle $\pi/4$ to compare the signs between adjacent components. In all three cases an $\ell_\infty$ tomography may be applied. $\ell_\infty$ tomography is a method that determines how many samples from a quantum state to take to retrieve an approximated description of it. The approximation is made with a relative error with respect to the 'infinite norm' (instead of the usual 'L2' or Euclidean norm).

The sign retrieval procedure may include three parts.

The circuit is first applied as described above (e.g., execute the circuit in FIG. 12A), allowing to retrieve each squared amplitude $y_j^2$ with precision $\delta>0$ using the $\ell_\infty$ tomography. The probability of measuring the unary state $|e_1\rangle$ (i.e. $|100 \ldots\rangle$), is $p(e_1)=y_i^2$.

The same steps are applied a second time on a modified circuit (e.g., execute the circuit in FIG. 12B). It has additional BS gates with angle $\pi/4$ at the end (e.g., sign circuit 1205A), which mixes the amplitudes pair by pair. The probabilities to measure $|e_1\rangle$ and $|e_2\rangle$ are now given by $p(e_1)=(y_1+y_2)^2$ and $p(e_2)=(y_1-y_2)^2$. Therefore if $p(e_1)>p(e_2)$, we have $\text{sign}(y_1)\neq\text{sign}(y_2)$, and if $p(e_1)<p(e_2)$, we have $\text{sign}(y_1)=\text{sign}(y_2)$. The same holds for the pairs $(y_3, y_4)$, and so on.

The same steps are applied again, except the additional BS gates are shifted by one position below (e.g., execute the circuit in FIG. 12C, including sign circuit 1205B). Then the signs of the pairs are compared: $(y_2, y_3)$, $(y_4, y_5)$, and so on.

Each value $y_1$ with its sign may be determined e.g., assuming that $y_1>0$. This procedure has the benefit of only adding a constant depth (in other words, it doesn't grow with the number of qubits). In this case, the depth increases by one. However, this process may use three times more runs. The overall cost of the tomography procedure with sign retrieval is given by $\tilde{O}(n/\delta^2)$.

Figure 13:
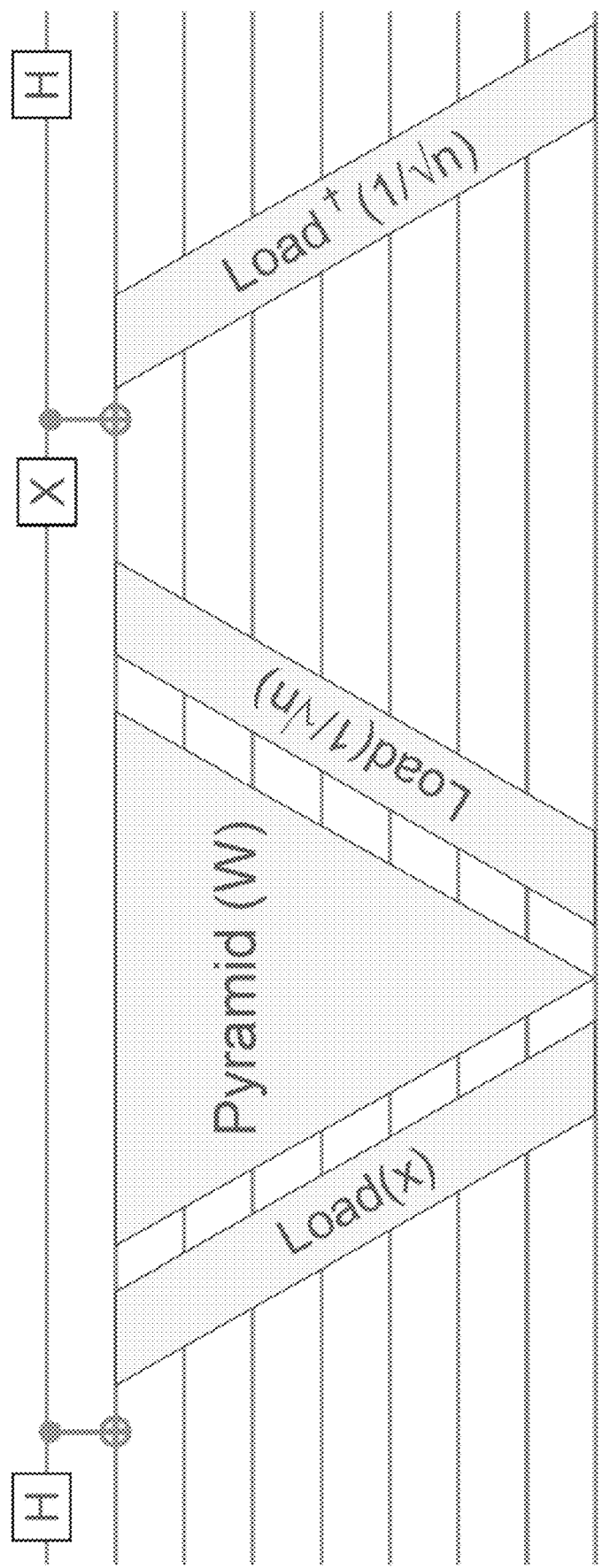
FIG. 13 is a diagram of another quantum circuit used to obtain the signs of a vector's components.

In FIG. 13 we propose another method to obtain the values of the amplitudes and their signs of each component of the resulting vector $|y\rangle = |Wx\rangle$. Compared to the above procedure, it executes a single circuit, but it may require an additional qubit, and the depth of the circuit may be $3n+O(1)$ instead of $2n+O(1)$. This circuit initializes the qubits in $(|0\rangle + |1\rangle)|0\rangle$, where the last $|0\rangle$ corresponds to the n qubits that will be processed by the pyramidal circuit and the loaders. Next, applying the data loader for the normalized input vector x, the pyramidal circuit, according to Eq.(6), maps the state to:

$$|0\rangle|0\rangle + |1\rangle \sum_{j=1}^{n} W_j x |e_j\rangle \quad (13)$$

Then, we use an additional data loader for the uniform norm-1 vector $$\left(\frac{1}{\sqrt{n}}, \ldots, \frac{1}{\sqrt{n}}\right).$$

Note that this loader is built in the reverse order to fit the pyramid and limit the augmentation of the depth. We also apply the adjoint of this loader after a controlled operation on the first extra qubit. Recall that if a circuit U is followed by $U^\dagger$, it is equivalent to the identity. Therefore, this loads the uniform state only in some part of the superposition of the extra qubit:

$$|1\rangle \sum_{j=1}^{n} \frac{1}{\sqrt{n}} |e_j\rangle + |0\rangle \sum_{j=1}^{n} W_j x |e_j\rangle \quad (14)$$

Afterwards, a Hadamard gate mixes both parts of the amplitudes on the extra qubit:

$$|1\rangle \sum_{j=1}^{n} \left(\frac{1}{\sqrt{n}} + W_j x\right) |e_j\rangle + |0\rangle \sum_{j=1}^{n} \left(\frac{1}{\sqrt{n}} - W_j x\right) |e_j\rangle \quad (15)$$

On this state, we can see that the probability of measuring the extra qubit in state 0 and rest in the unary state $e_j$ is given by $$p(0, e_j) = \left(\frac{1}{\sqrt{n}} + W_j x\right)^2.$$

Therefore, for each j, if after several measurements we observe $$p(0, e_j) > \frac{1}{n},$$

we can deduce $W_j x > 0$. Having the sign, we can get the value $$W_j x = \pm \sqrt{p(0, e_j)} - \frac{1}{\sqrt{n}}.$$

Combining with the $\ell_\infty$ tomography and the non linearity, the overall cost of this tomography is given by $\tilde{O}(n/(\delta^2))$ as well.

10.2 Multiple Quantum Layers

In the previous sections, we have seen how to implement a quantum circuit to perform the evolution of one orthogonal layer. In classical deep learning, such layers are stacked to gain in expressivity and accuracy. Between each layer, a non-linear function may be applied to the resulting vector.

The benefit of using our quantum pyramidal circuit is the ability to simply concatenate them to mimic a multi-layer neural network. After each layer, a tomography of the output state $|z\rangle$ is performed to retrieve each component, corresponding to its quantum amplitudes. A nonlinear function a is then applied classically to obtain $a=\sigma(z)$. The next layer starts with a new unary data loader. This scheme allows us to keep the depth of the quantum circuits reasonable for NISQ devices, by applying the neural network layer by layer.

Figure 14A:
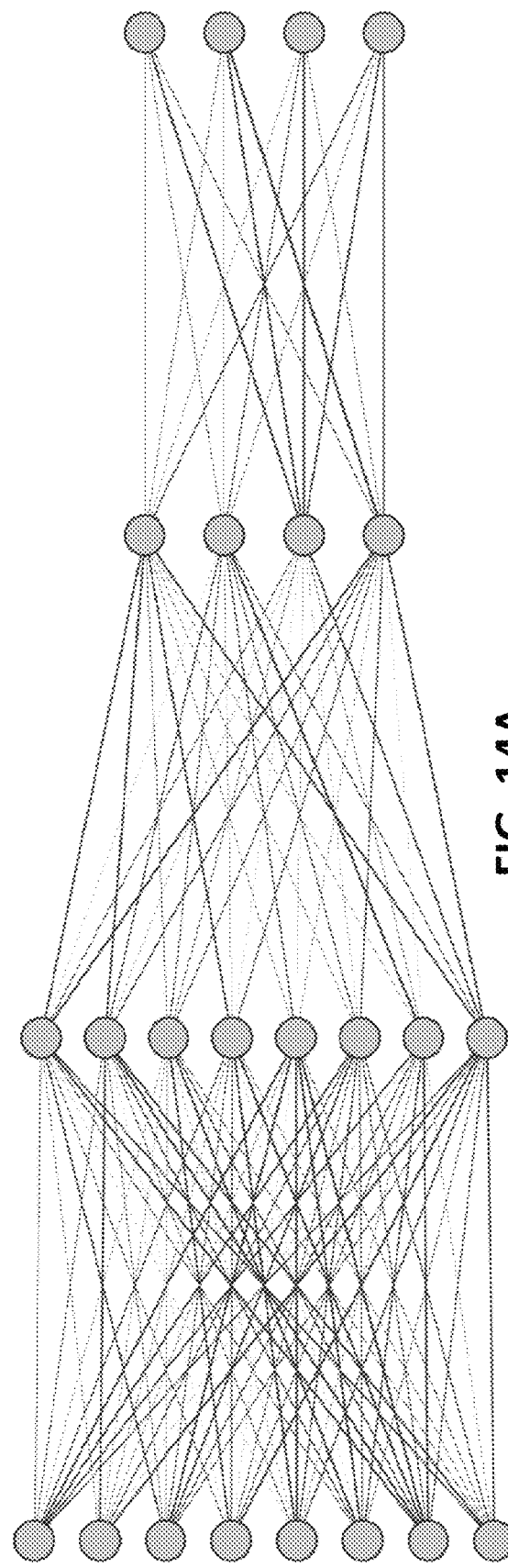
FIG. 14A is a diagram or a neural network with three layers.
Figure 14B:
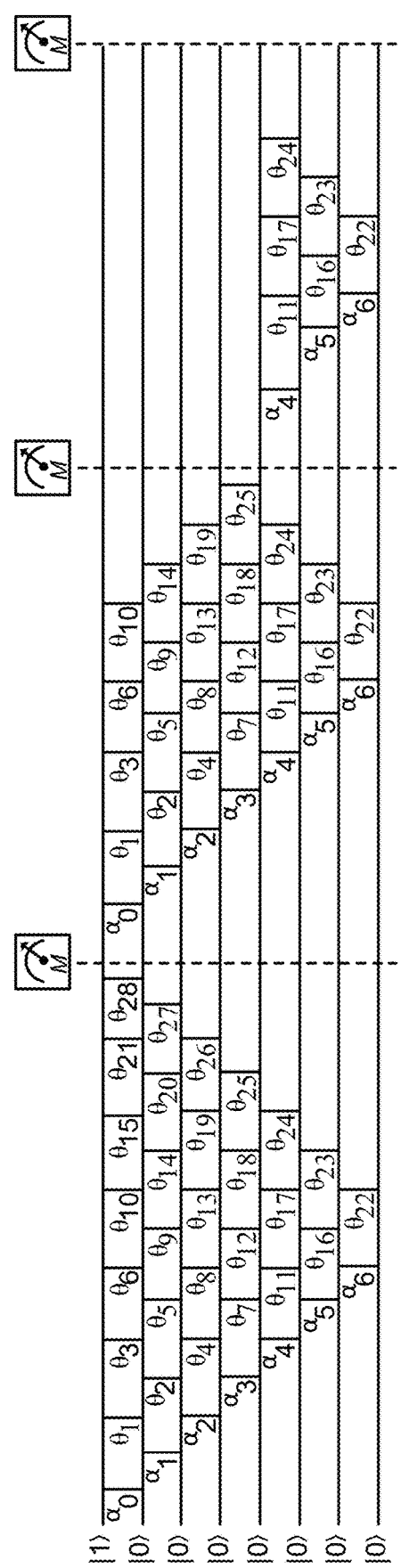
FIG. 14B is a diagram of a quantum circuit for the neural network in FIG. 14A.

FIGS. 14A and 14B each illustrate an example neural network with layers. FIG. 14A illustrates a classical representation of a neural network with three layers. The nodes of the layers [8,8,4,4]. FIG. 14B illustrates the equivalent neural network using a quantum circuit. The circuit includes a concatenation of multiple pyramidal circuits (gates in the pyramid circuits have parameter N. Between each layer a measurement operation is performed and a non linearity is applied. Additionally, each layer starts with a new unary data loader (gates in the data loader circuits have parameter au)

In some embodiments, the circuit can include additional entangling gates after each pyramid layer (composed for instance of CNOT or CZ). This would mark a step out of the unary basis but may effectively allow to explore more interactions in the Hilbert Space.

11. Example Circuits

This section describes example quantum circuits with different architectures that can be used to implement a layer of an orthogonal neural network. The details of them are summarized below in Table 2:

TABLE 2

Example circuits to implement a layer of an orthogonal neural network

Figure 18A:
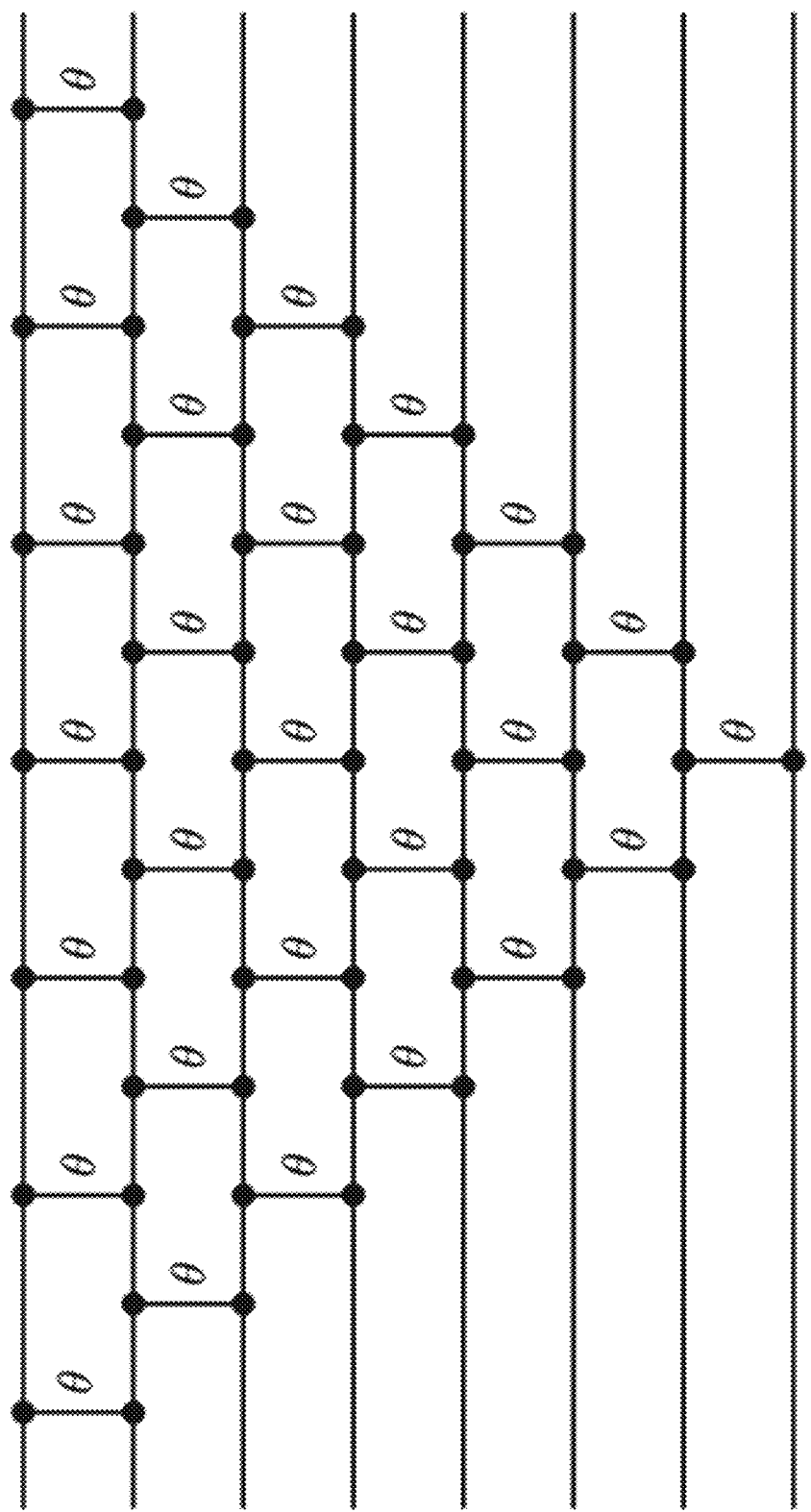
FIGS. 18A-18E are diagrams of example quantum circuits.
Figure 18B:
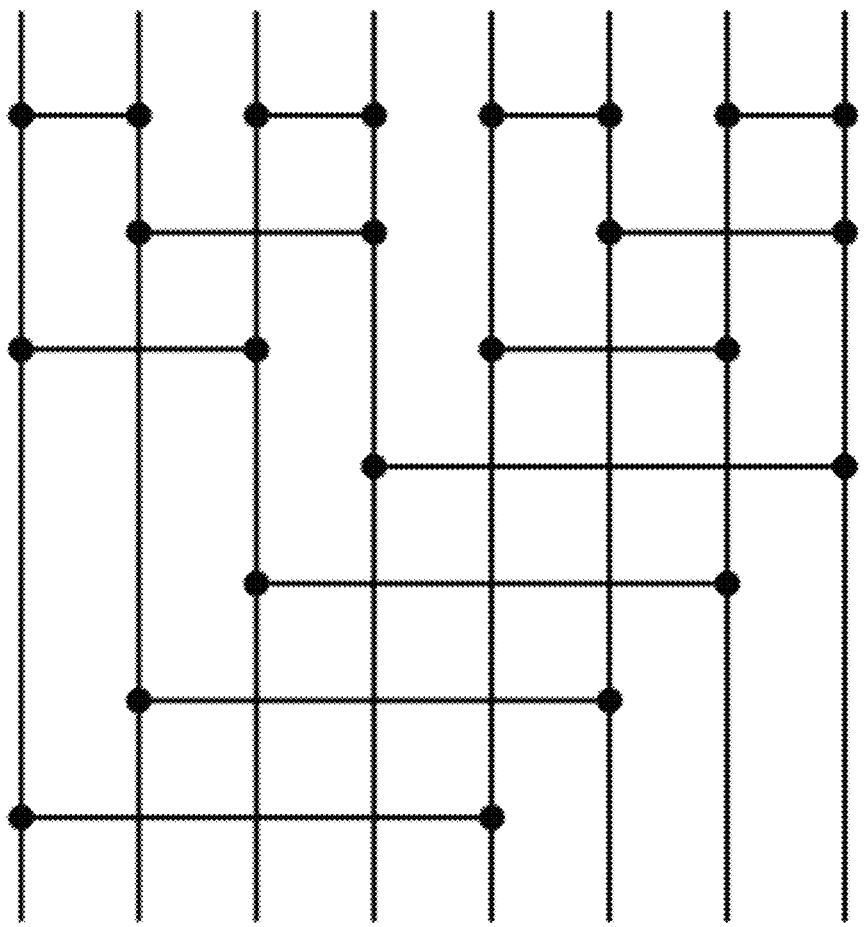
Figure 18C:
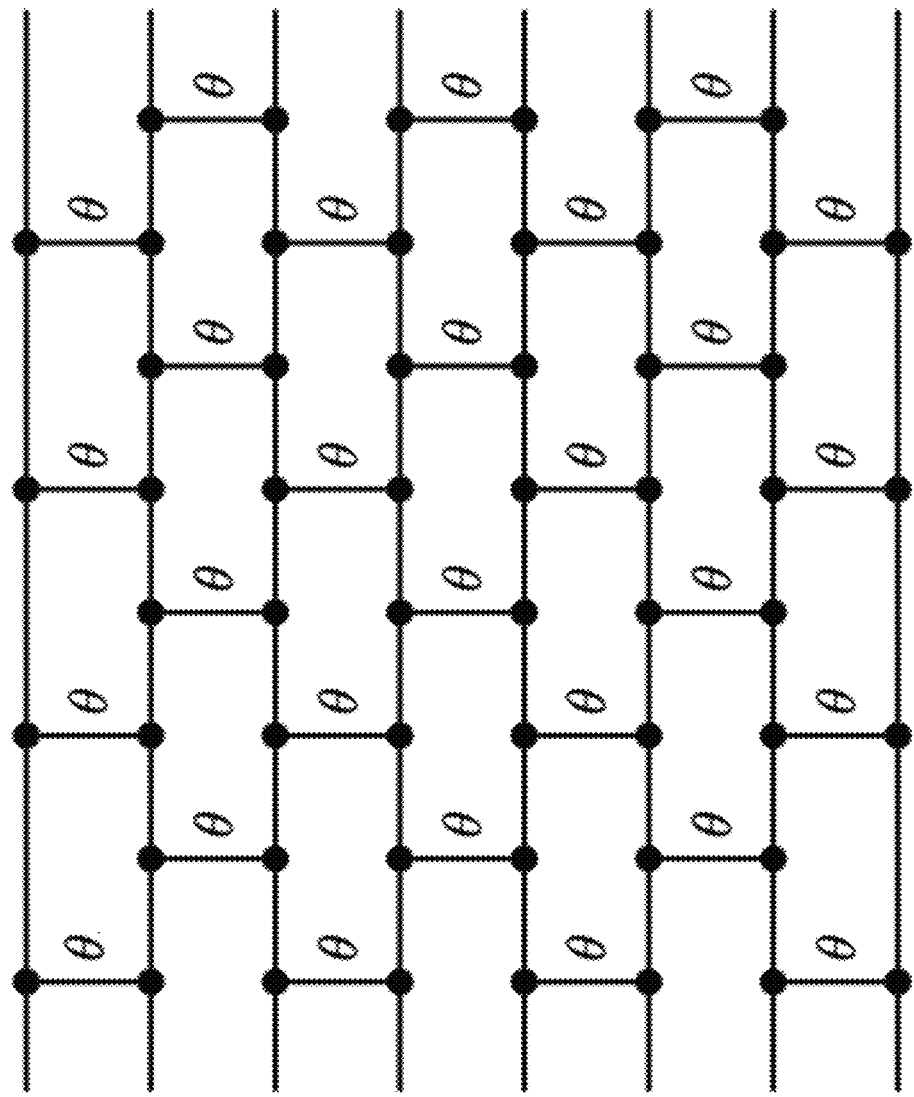
Figure 18D:
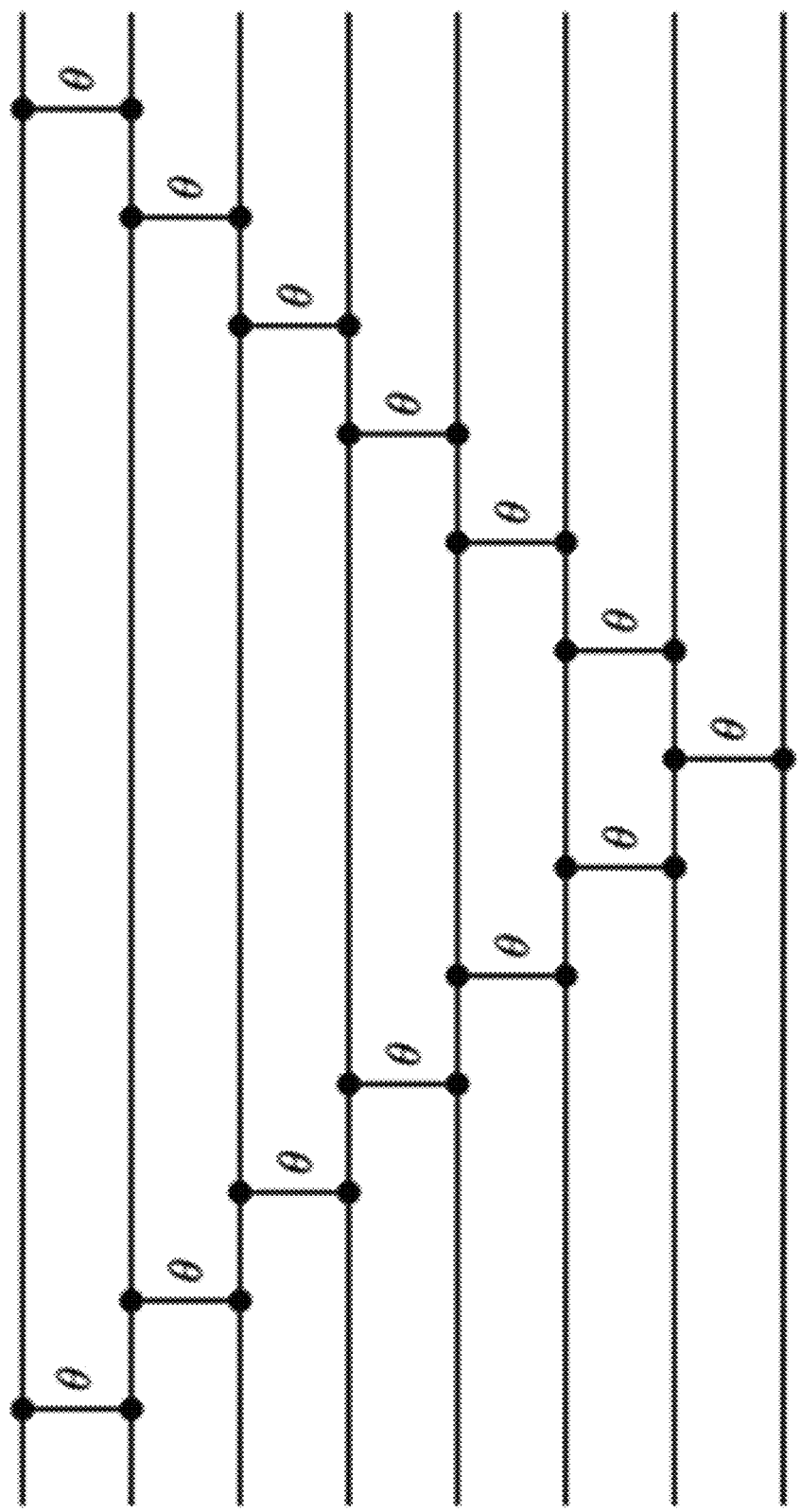
Figure 18E:
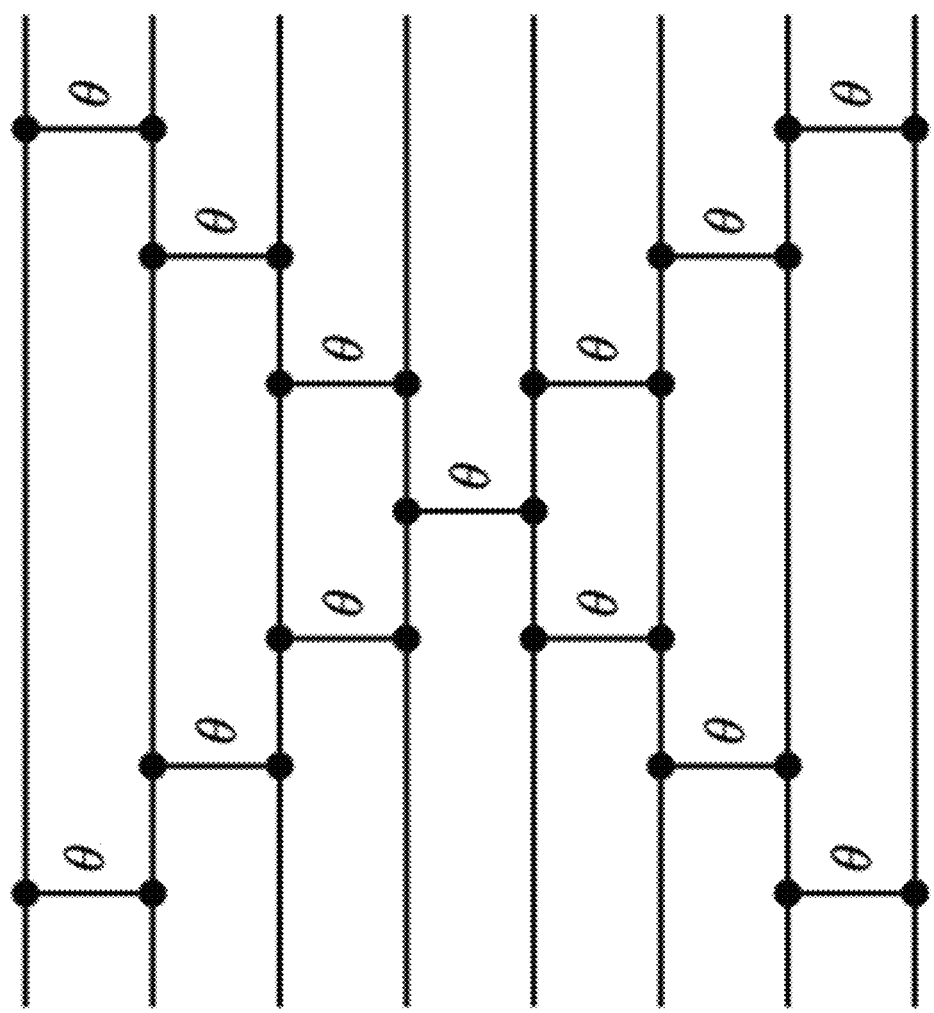

| Name | Example Figure | No. of Gates | Depth | Example Connectivity |
|---|---|---|---|---|
| Pyramid | FIG. 18A | n(n − 1)/2 | 2n − 3 | Nearest Neighbors |
| Butterfly | FIG. 18B | nlog(n)/2 | log(n) | All-to-All Connectivity |
| Brick | FIG. 18C | n(n − 1)/2 | n | Nearest Neighbors |
| V | FIG. 18D | 2n − 3 | 2n − 3 | Nearest Neighbors |
| X | FIG. 18E | 2n − 3 | n − 1 | Nearest Neighbors |

Descriptions of the circuits listed in Table 2 are provided below.

The pyramid circuit is described in other sections. An example pyramid circuit is illustrated in FIG. 18A.

The butterfly circuit was inspired by the butterfly circuits of the Cooley-Tukey FFT algorithm. The butterfly circuit described herein is an efficient way to characterize a reduced yet powerful class of orthogonal layers. This circuit is a low depth circuit as compared to others (log(n) depth). The butterfly layer does not characterize all the orthogonal matrices (with determinant 1) due to reduced number of parameters (n log(n)/2) but still covers a class of orthogonal matrices, like the unary Fourier Transform. This circuit may require all-to-all qubit connectivity. A parallel data loader may be preferred with this circuit.

An example butterfly circuit is illustrated in FIG. 18B. The vertical lines in FIG. 18B represent BS gates. The layers of the butterfly circuit in FIG. 18B may be described as follows. The first layer applies a BS gate the first qubit and the fifth qubit. The second layer applies a BS gate to the second qubit and the sixth qubit. The third layer applies a BS gate to the third qubit and a seventh qubit. The fourth layer applies a BS gate to the fourth qubit and the eighth qubit (the eighth qubit is the last qubit in this example). The fifth layer applies a BS gate to the first qubit and the third qubit and a BS gate to the fifth qubit and the seventh qubit. The sixth layer applies a BS gate to the second qubit and the fourth qubit and a BS gate to the sixth qubit and the eighth qubit. The seventh layer includes: a BS gate applied to the first qubit and the second qubit, a BS gate applied to the third qubit and the fourth qubit, a BS gate applied to the fifth qubit and the sixth qubit, and a BS gate applied to the seventh qubit and the eighth qubit. However, other arrangements are possible depending on the positions of the qubits in the diagram.

The brick circuit is the most depth efficient orthogonal layer circuit with BS gates in Table 2 which can characterize the entire class of orthogonal matrices with determinant 1. The brick circuit may have the same number of parameters as the Pyramid circuit (n(n−1)/2) but about half the depth. Some embodiments of the brick circuit use nearest neighbor qubit connectivity. However, loading data using a data loader may add an additional depth (e.g., n/2 for a semi-diagonal loader or log(n) for a parallel loader). In many cases, the brick circuit may be preferred (e.g., optimal) due to its small depth.

An example brick circuit is illustrated in FIG. 18C. The layers of the brick circuit in FIG. 18C may be described as follows: the first layer applies a BS gate to qubits 1 and 2, a BS gate to qubits 3 and 4, a BS gate to qubits 5 and 6, and a BS gate to qubits 7 and 8. The second layer applies a BS gate to qubits 2 and 3, a BS gate to qubits 4 and 5, and a BS gate to qubits 6 and 7. The following layers have a similar arrangement as the first two layers. In FIG. 18C this results in the BS gates forming a rectangle shape. However, other shapes are possible depending on the positions of the qubits in the diagram.

The V circuit is a reduced version of the pyramid circuits. The V circuit is designed for NISQ hardware. This layer provides a path from every qubit to every qubit but has only linear parameters (2n−3). It may be preferred to use a diagonal data loader with the V circuit.

An example V circuit is illustrated in FIG. 18D. The layers of the V circuit FIG. 18D may be described as follows: the first layer applies a BS gate to qubits 1 and 2. The second layer applies a BS gate to qubits 2 and 3. This pattern continues until the seventh layer applies a BS gate to qubits 7 and 8 (qubit 8 is the last qubit in this example). The eight layer applies a BS gate to qubits 6 and 7. The ninth layer applies a BS gate to qubits 5 and 6. This pattern continues until the last layer applies a BS gate to qubits 1 and 2. In FIG. 18D this results in the BS gates forming a V shape. However, other shapes are possible depending on the positions of the qubits in the diagram.

The X circuit (not to be confused with an X gate) is a reduced version of the brick circuit. The X circuit is designed for NISQ hardware. This layer provides a path from every qubit to every qubit but has only linear parameters (2n−3). The additional loader depth may be the same as brick circuit.

An example X circuit is illustrated in FIG. 18E. The layers of the X circuit FIG. 18E may be described as follows: the first layer applies a BS gate to qubits 1 and 2 and a BS gate to qubits 7 and 8 (qubit 8 is the last qubit in this example). The second layer applies a BS gate to qubits 2 and 3 and a BS gate to qubits 6 and 7. The third layer applies a BS gate to qubits 3 and 4 and a BS gate to qubits 5 and 6. The fourth layer applies a BS gate to qubits 4 and 5. The pattern continues in reverse order until the last layer applies a BS gate to qubits 1 and 2 and a BS gate to qubits 7 and 8. In FIG. 18E this results in the BS gates forming an X shape. However other shapes are possible depending on the positions of the qubits in the diagram.

The training methods for the above circuits may be the same as described in Section 4. For example, we go inner-layer-by-inner-layer and update each angle using the same update rule as described above for the pyramid layers.

As stated above, the above circuits provide a path from each qubit to every other qubit. For example, looking at one of the circuit diagrams in FIGS. 18A-18E, one can trace a set of paths from one qubit to any other qubit using the horizontal lines (wires) and the vertical lines (BS gates). Each set of paths from one qubit to another corresponds to one element of the orthogonal matrix (e.g., the matrix corresponding to the quantum circuit, restricted to the 'unary' basis). If a path from one qubit to another is not available, the matching element of the matrix is not tunable. This helps implement a layer of a fully connected neural network since each input node is connected to each output node in a fully connected neural network layer.

The above circuits may characterize the special orthogonal group, i.e., the orthogonal matrices with determinant +1. They may be generalized to incorporate the ones with determinant −1 as well by applying a Z gate in the end on the last qubit.

11.1 Performing Unary Fourier Transform Using Butterfly Circuits

Classically, the matrix that implements a Fourier transform (FFT) is given by:

$$W = \frac{1}{\sqrt{N}} \begin{bmatrix} 1 & 1 & 1 & 1 & \ldots & 1 \\ 1 & \omega & \omega^2 & \omega^3 & \ldots & \omega^{N-1} \\ 1 & \omega^2 & \omega^4 & \omega^6 & \ldots & \omega^{2(N-1)} \\ 1 & \omega^3 & \omega^6 & \omega^9 & \ldots & \omega^{3(N-1)} \\ \vdots & \vdots & \vdots & \vdots & \ddots & \vdots \\ 1 & \omega^{N-1} & \omega^{2(N-1)} & \omega^{3(N-1)} & \ldots & \omega^{(N-1)(N-1)} \end{bmatrix}$$

where the omegas are roots of unity.

Figure 19:
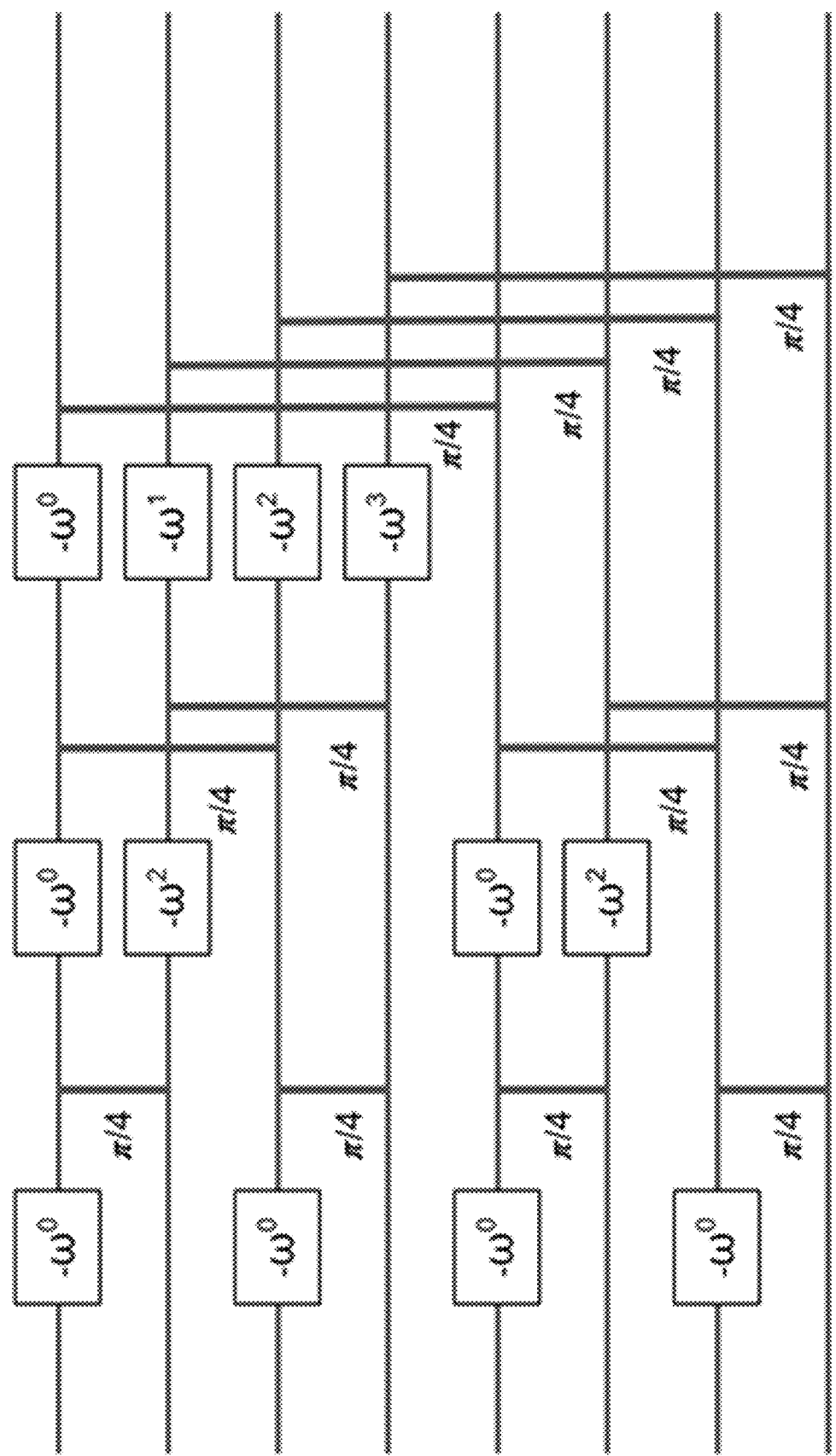
FIG. 19 is a diagram of another quantum circuit.

A Fourier Transform in the unary domain may be performed by using the butterfly circuit architecture with one additional single qubit gate per BS gate. FIG. 19 is a diagram of a circuit for unary Fourier Transform using butterfly circuits. The circuit includes BS gates (vertical lines) all with fixed angles $$\frac{\pi}{4}.$$

The circuit also includes also uses another type of one-qubit rotation gate represented by a white square with $-\omega^k$ in it, for which the matrix is given by $[[1, 0], [0, -\omega^k]]$, where co is the corresponding root of unity. Thus, the circuit in FIG. 19 is a quantum circuit for which the unitary matrix (restricted to the unary basis) is exactly the FFT matrix.

12. Example Methods 12.1 Example Method of Executing a Quantum Circuit to Implement a Layer of a Neural Network.

FIG. 16 is a flowchart of an example method for executing a quantum circuit to implement a layer of a neural network. The layer of the neural network has n>0 input nodes, d>0 output nodes, and an orthogonal weight matrix. The method is described as being performed by a computing system that, for example, includes a classical computing system and quantum computing system. The computing system may perform the operations of the method by executing instructions stored on a non-transitory computer readable storage medium.

The computing system executes 1610 at least $O(\log(n))$ layers of the quantum circuit that apply BS gates, each BS gate being a single parameterized two-qubit gate, the number of BS gates being equal to the number of degrees of freedom of the orthogonal weight matrix. In some embodiments, the BS gates are applied to x>0 qubits of a quantum computer. In some embodiments, execution of the at least $O(\log(n))$ layers of the quantum circuit is performed by a classical computer simulating a quantum computer (e.g., see Section 3.1 for more information). In some embodiments, the layer of the neural network is fully connected. In some embodiments, n=d.

The number of BS gates in the $O(\log(n))$ layers may be equal to $(2n-1-d)*d/2$ (e.g., see Section 2 for more information). In some embodiments, the $O(\log(n))$ layers only include BS gates (e.g., see FIGS. 2A and 2A and related descriptions). Additionally, or alternatively, the number of qubits x equals the number of input nodes n of the layer of the neural network (e.g., see FIGS. 2A-3B and related descriptions).

In some embodiments, each BS gate is applied to adjacent qubits of the quantum computer. Adjacent qubits may refer to nearest neighbor qubits on a qubit register of the quantum computer. Generally, a pair of non-adjacent qubits are qubits that are far enough apart, or with sufficiently many obstructing qubits or other components between them, that the mechanism used to couple the qubits in the physical platform they are implemented with does not work to implement a two-qubit interaction directly between the pair without some modification to the coupling procedure or hardware. Adjacent qubits on a qubit register may be adjacent to each other on a circuit diagram. For example, with respect to FIG. 2A, qubit 2 may be adjacent to qubits 1 and 3 on a qubit register.

In some embodiments, the at least $O(\log(n))$ layers apply BS gates to the qubits according to a pyramid pattern (e.g., see FIG. 2A). In some embodiments, the pyramid pattern includes: a first layer including a first BS gate applied to a first qubit and a second qubit; a second layer including a second BS gate applied to the second qubit and a third qubit; a third layer including a third BS gate applied to the first qubit and the second qubit, and a fourth BS gate applied to the third qubit and a fourth qubit; and a fourth layer including a fifth BS gate applied to the second qubit and the third qubit, and a sixth BS gate applied to the fourth qubit and a firth qubit. This pattern may continue until a BS gate is applied to a final qubit (e.g., qubit 8 in FIG. 2A). After that, layers of BS gates may be applied to the qubits in a reverse order. For example, the pyramid pattern includes a last layer that applies a BS gate to the first and second qubits, a second to last layer that applies a BS gate to the second and third qubits, etc.

In some embodiments, the computing system prepares a unary quantum state on the x qubits of the quantum computer (e.g., by executing quantum gates), the unary quantum state corresponding to input data (e.g., a vector) to be applied to the layer of the neural network (e.g., see Section 2.3 for more information). The unary quantum state may be a superposition of unary states corresponding to the input data vector. In some embodiments, an output quantum state formed on the x qubits by executing the at least $O(\log(n))$ layers is also a unary quantum state, the output unary quantum state corresponding to output data of the layer of the neural network (e.g., see Section 3 for more information). In some embodiments, the computing system prepares the unary quantum state on the x qubits by: executing a first layer that applies an X gate to one of the x qubits; and after executing the first layer, executing n−1 layers that apply n−1 BS gates to the x qubits of the quantum computer (e.g., see FIG. 4A and related description for more information). At least one of: (1) the first layer or (2) at least one of the n−1 layers may be executed before one of the $O(\log(n))$ layers is executed (e.g., as described with respect to FIG. 4A, an X gate and a gate of the data loader circuit 405 are executed before the first gate of the pyramid circuit 410). In some embodiments, one or more of the $O(\log(n))$ layers are executed concurrently with one or more of the n−1 layers (e.g., with respect to FIG. 4A, some gates of the data loader circuit 405 are executed concurrently with some gates of the pyramid circuit 410). In some embodiments, the n−1 layers apply the n−1 BS gates according to a linear cascade pattern (e.g., see circuit 405 in FIG. 4A).

12.2 Example Method of Training a Layer of a Neural Network.

FIG. 17 is a flowchart of an example method 1700 for training a layer of a neural network with an orthogonal weight matrix. The steps of method 1700 may be performed in different orders, and the method may include different, additional, or fewer steps. The method is described as being performed by a computing system that, for example, includes a classical computing system and quantum computing system. The computing system may perform the operations of the method by executing instructions stored on a non-transitory computer readable storage medium. Furthermore, a neural network manufactured by the steps of method 1700 may be stored on a non-transitory computer readable storage medium. See Section 4 for more information on training a quantum neural network.

The computing system executes 1710 layers of BS gates of a quantum circuit. Each BS gate is a single parameterized two-qubit gate. Weights of the weight matrix are based on values of parameters of the BS gates. In some embodiments, a quantum computing system executes the layers of the BS gates of the quantum circuit.

The computing system determines 1720 gradients of a cost function with respect to parameters of the BS gates of the quantum circuit.

The computing system updates 1730 values of parameters of the BS gates of the quantum circuit based on the gradients of the cost function. The updated values of the parameters preserve the orthogonality of the weight matrix.

In some embodiments, determining gradients of the cost function comprises determining gradients of the cost function with respect to the parameter of each BS gate of the quantum circuit.

In some embodiments, executing layers of BS gates of the quantum circuit includes the computing system measuring a resulting quantum state $\zeta^\lambda$ after each layer $\lambda$ of the quantum circuit is executed. In some embodiments, the computing system determines errors $\delta$ for layers $\lambda$ of the quantum circuit. In some embodiments, determining errors $\delta$ for layers $\lambda$ of the quantum circuit comprises the computing system determining errors for each layer of the quantum circuit in reverse order according to: $\delta^\lambda = (w^\lambda)^T \cdot \delta^{\lambda+1}$, where $\delta^\lambda$ is the error for layer $\lambda$ of the quantum circuit and $w^\lambda$ is a matrix representation of BS gates in layer $\lambda$ of the quantum circuit. The gradient of the cost function C with respect to a parameter $\theta_i$ of a BS gate acting on qubits i and i+1 may be defined by:

$$\frac{\partial C}{\partial \theta_i} = \delta_i^{\lambda+1}\left(-\sin\,(\theta_i)\zeta_i^\lambda + \cos\,(\theta_i)\zeta_{i+1}^\lambda\right) + \delta_{i+1}^{\lambda+1}\left(-\cos\,(\theta_i)\zeta_i^\lambda - \sin\,(\theta_i)\zeta_{i+1}^\lambda\right).$$

In some embodiments, updating values of the parameters of the BS gates of the quantum circuit based on the gradients of the cost function includes the computing system: updating a value of a parameter $\theta_i$ of a BS gate of the quantum circuit according to $$\theta_i \leftarrow \theta_i - \eta\frac{\partial C}{\partial \theta_i},$$

where $\eta$ is a learning rate.

13. Description of a Computing System

Figure 20A:
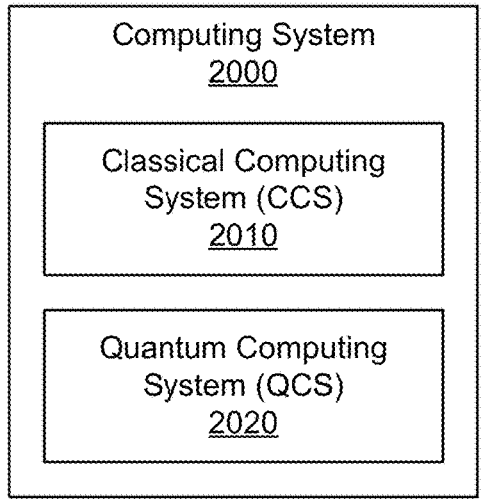
FIG. 20A is a block diagram that illustrates a computing system.

FIG. 20A is a block diagram that illustrates an embodiment of a computing system 2000. In the example of FIG. 20A, the computing system 2000 includes a classical computing system 2010 (also referred to as a non-quantum computing system) and a quantum computing system 2020, however a computing system may just include a classical computing system or a quantum computing system. The classical computing system 2010 may control the quantum computing system 2020. An embodiment of the classical computing system 2010 is described further with respect to FIG. 15. While the classical computing system 2010 and quantum computing system 2020 are illustrated together, they may be physically separate systems (e.g., in a cloud architecture). In other embodiments, the computing system 2000 includes different or additional elements (e.g., multiple quantum computing systems 2020). In addition, the functions may be distributed among the elements in a different manner than described.

Figure 20B:
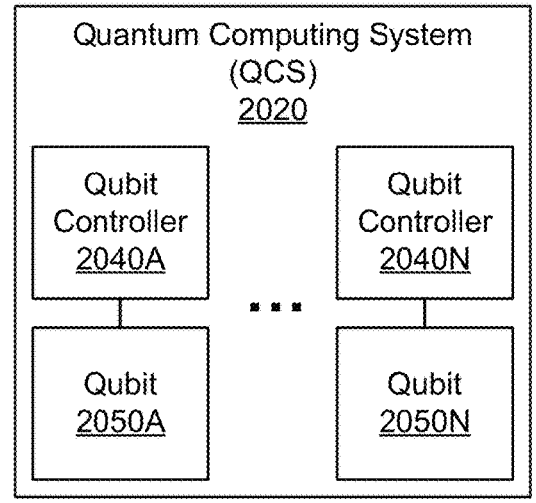
FIG. 20B is a block diagram that illustrates a quantum computing system.
Figure 20C:
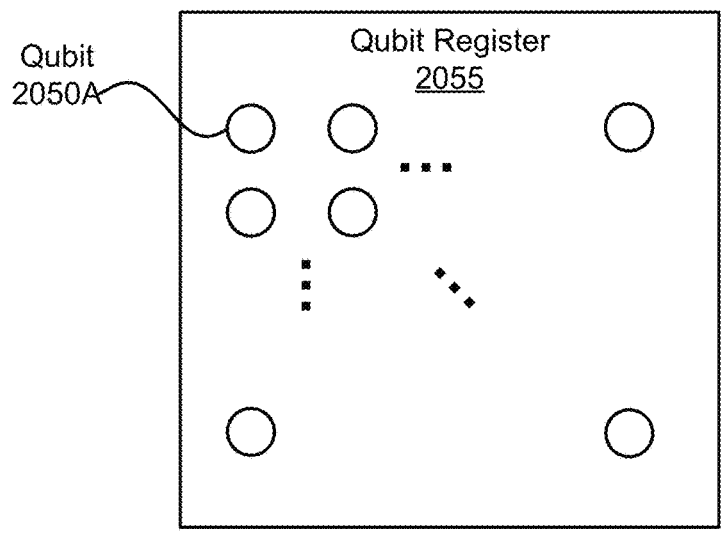
FIG. 20C is a block diagram of a qubit register.

FIG. 20B is a block diagram that illustrates an embodiment of the quantum computing system 2020. The quantum computing system 2020 includes any number of quantum bits ("qubits") 2050 and associated qubit controllers 2040. As illustrated in FIG. 20C, the qubits 150 may be in a qubit register of the quantum computing system 2020. Qubits are further described below. A qubit controller 2040 is a module that controls one or more qubits 2050. A qubit controller 2040 may include a classical processor such as a CPU, GPU, or FPGA. A qubit controller 2040 may perform physical operations on one or more qubits 2050 (e.g., it can perform quantum gate operations on a qubit 2040). In the example of FIG. 20B, a separate qubit controller 2040 is illustrated for each qubit 2050, however a qubit controller 2050 may control multiple (e.g., all) qubits 2050 of the quantum computing system 2020 or multiple controllers 2050 may control a single qubit. For example, the qubit controllers 2050 can be separate processors, parallel threads on the same processor, or some combination of both. In other embodiments, the quantum computing system 2020 includes different or additional elements. In addition, the functions may be distributed among the elements in a different manner than described.

Figure 20D:
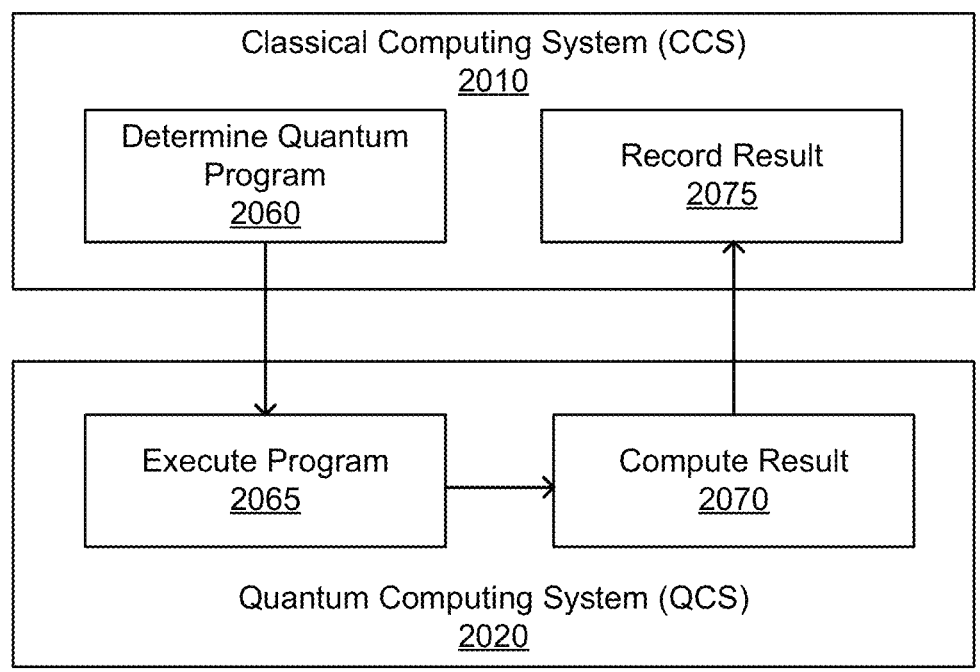
FIG. 20D is a flow chart that illustrates an example execution of a quantum routine on a computing system.

FIG. 20D is a flow chart that illustrates an example execution of a quantum routine on the computing system 2000. The classical computing system 2010 generates 2060 a quantum program to be executed or processed by the quantum computing system 2020. The quantum program may include instructions or subroutines to be performed by the quantum computing system 2020. In an example, the quantum program is a quantum circuit. This program can be represented mathematically in a quantum programming language or intermediate representation such as QASM or Quil.

The quantum computing system 2020 executes 2065 the program and computes 2070 a result (referred to as a shot or run). Computing the result may include performing a measurement of a quantum state generated by the quantum computing system 2020 that resulted from executing the program. Practically, this may be performed by measuring values of one or more of the qubits 2050. The quantum computing system 2020 typically performs multiple shots to accumulate statistics from probabilistic execution. The number of shots and any changes that occur between shots (e.g., parameter changes)) may be referred to as a schedule. The schedule may be specified by the program. The result (or accumulated results) is recorded 2075 by the classical computing system 2010. Results may be returned after a termination condition is met (e.g., a threshold number of shots occur).

Figure 21:
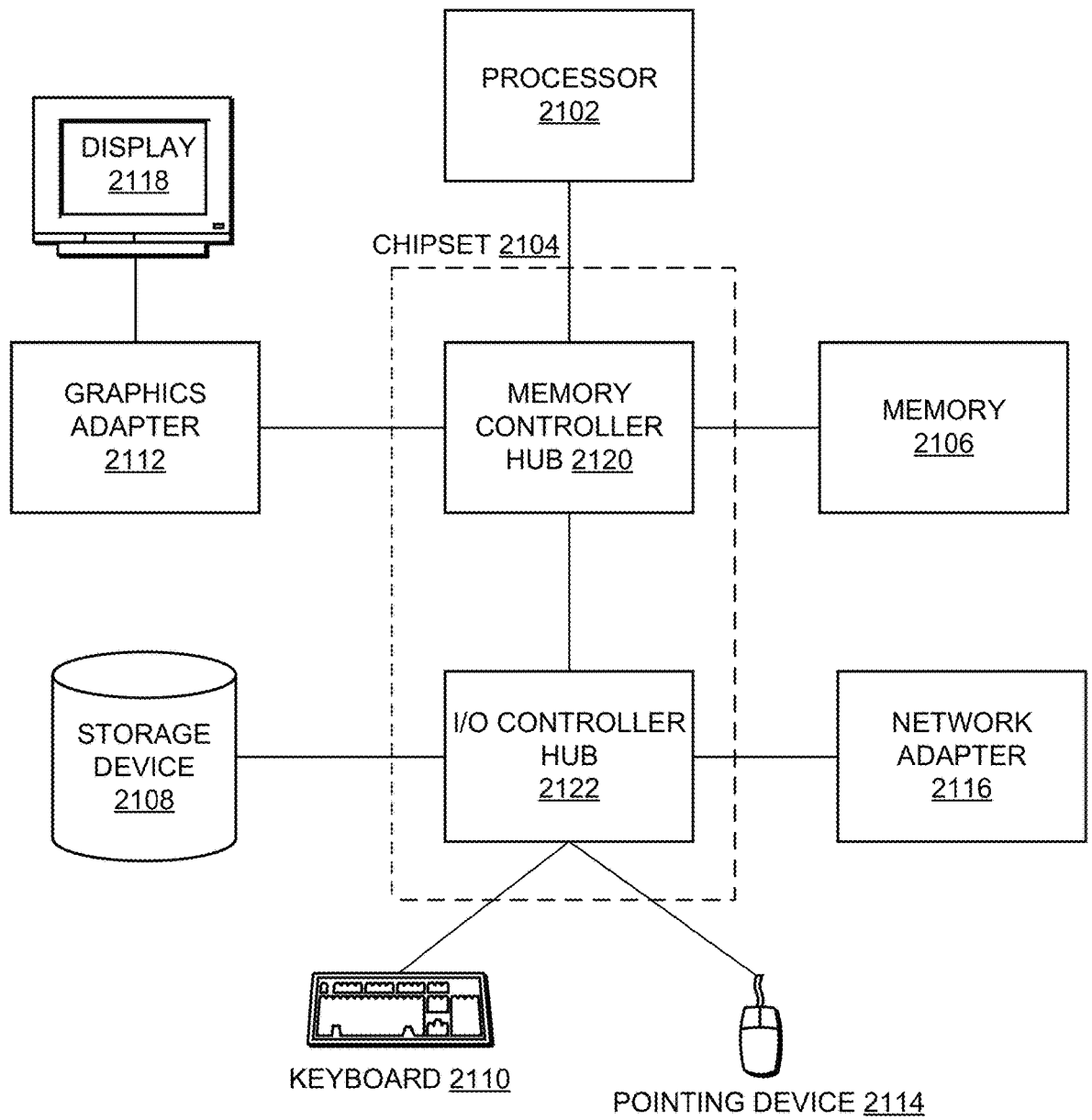
FIG. 21 is an example architecture of a classical computing system.

FIG. 21 is an example architecture of a classical computing system 2010, according to an embodiment. The quantum computing system 2020 may also have one or more components described with respect to FIG. 21. Although FIG. 21 depicts a high-level block diagram illustrating physical components of a computer system used as part or all of one or more entities described herein, in accordance with an embodiment. A computer may have additional, less, or variations of the components provided in FIG. 21. Although FIG. 21 depicts a computer 2100, the figure is intended as functional description of the various features which may be present in computer systems than as a structural schematic of the implementations described herein. In practice, and as recognized by those of ordinary skill in the art, items shown separately could be combined and some items could be separated.

Illustrated in FIG. 21 are at least one processor 2102 coupled to a chipset 2104. Also coupled to the chipset 2104 are a memory 2106, a storage device 2108, a keyboard 2110, a graphics adapter 2112, a pointing device 2114, and a network adapter 2116. A display 2118 is coupled to the graphics adapter 2112. In one embodiment, the functionality of the chipset 2104 is provided by a memory controller hub 2120 and an I/O hub 2122. In another embodiment, the memory 2106 is coupled directly to the processor 2102 instead of the chipset 2104. In some embodiments, the computer 2100 includes one or more communication buses for interconnecting these components. The one or more communication buses optionally include circuitry (sometimes called a chipset) that interconnects and controls communications between system components.

The storage device 2108 is any non-transitory computer-readable storage medium, such as a hard drive, compact disk read-only memory (CD-ROM), DVD, or a solid-state memory device or other optical storage, magnetic cassettes, magnetic tape, magnetic disk storage or other magnetic storage devices, magnetic disk storage devices, optical disk storage devices, flash memory devices, or other non-volatile solid state storage devices. Such a storage device 2108 can also be referred to as persistent memory. The pointing device 2114 may be a mouse, track ball, or other type of pointing device, and is used in combination with the keyboard 2110 to input data into the computer 2100. The graphics adapter 2112 displays images and other information on the display 2118. The network adapter 2116 couples the computer 2100 to a local or wide area network.

The memory 2106 holds instructions and data used by the processor 2102. The memory 2106 can be non-persistent memory, examples of which include high-speed random access memory, such as DRAM, SRAM, DDR RAM, ROM, EEPROM, flash memory.

As is known in the art, a computer 2100 can have different or other components than those shown in FIG. 21. In addition, the computer 2100 can lack certain illustrated components. In one embodiment, a computer 2100 acting as a server may lack a keyboard 2110, pointing device 2114, graphics adapter 2112, or display 2118. Moreover, the storage device 2108 can be local or remote from the computer 2100 (such as embodied within a storage area network (SAN)).

As is known in the art, the computer 2100 is adapted to execute computer program modules for providing functionality described herein. As used herein, the term "module" refers to computer program logic utilized to provide the specified functionality. Thus, a module can be implemented in hardware, firmware, or software. In one embodiment, program modules are stored on the storage device 2108, loaded into the memory 2106, and executed by the processor 302.

Referring back to FIGS. 20A-20C, the quantum computing system 2020 exploits the laws of quantum mechanics in order to perform computations. A quantum processing device, quantum computer, quantum processor, and quantum processing unit are each examples of a quantum computing system. A quantum computing system can be a universal or a non-universal quantum processing device (a universal quantum device can execute any possible quantum circuit (subject to the constraint that the circuit doesn't use more qubits than the quantum device possesses)). Quantum processing devices commonly use so-called qubits, or quantum bits. While a classical bit always has a value of either 0 or 1, a qubit is a quantum mechanical system that can have a value of 0, 1, or a superposition of both values. Example physical implementations of qubits include superconducting qubits, spin qubits, trapped ions, arrays of neutral atoms, and photonic systems (e.g., photons in waveguides). For the purposes of this disclosure, a qubit may be realized by a single physical qubit or as an error-protected logical qubit that itself comprises multiple physical qubits. The disclosure is also not specific to qubits. The disclosure may be generalized to apply to quantum computing systems whose building blocks are qudits (d-level quantum systems, where d>2) or quantum continuous variables, rather than qubits.

A quantum circuit is an ordered collection of one or more gates. A sub-circuit may refer to a circuit that is a part of a larger circuit. A gate represents a unitary operation performed on one or more qubits. Quantum gates may be described using unitary matrices. The depth of a quantum circuit is the least number of steps needed to execute the circuit on a quantum computing system. The depth of a quantum circuit may be smaller than the total number of gates because gates acting on non-overlapping subsets of qubits may be executed in parallel. A layer of a quantum circuit may refer to a step of the circuit, during which multiple gates may be executed in parallel. In some embodiments, a quantum circuit is executed by a quantum computing system. In this sense a quantum circuit can be thought of as comprising a set of instructions or operations that a quantum computing system can execute. To execute a quantum circuit on a quantum computing system, a user may inform the quantum computing system what circuit is to be executed. A quantum computing system may include both a core quantum device and a classical peripheral/control device (e.g., a qubit controller) that is used to orchestrate the control of the quantum device. It is to this classical control device that the description of a quantum circuit may be sent when one seeks to have a quantum computer execute a circuit.

A variational quantum circuit may refer to a parameterized quantum circuit that is executed many times, where each time some of the parameter values may be varied. The parameters of a parameterized quantum circuit may refer to parameters of the gate unitary matrices. For example, a gate that performs a rotation about the y axis may be parameterized by a real number that describes the angle of the rotation. Variational quantum algorithms are a class of hybrid quantum-classical algorithm in which a classical computer is used to choose and vary the parameters of a variational quantum circuit. Typically, the classical processor updates the variational parameters based on the outcomes of measurements of previous executions of the parameterized circuit.

The description of a quantum circuit to be executed on one or more quantum computers may be stored in a non-transitory computer-readable storage medium. The term "computer-readable storage medium" should be taken to include a single medium or multiple media (e.g., a centralized or distributed database, or associated caches and servers) able to store instructions. The term "computer-readable medium" shall also be taken to include any medium that is capable of storing instructions for execution by the quantum computing system and that cause the quantum computing system to perform any one or more of the methodologies disclosed herein. The term "computer-readable medium" includes, but is not limited to, data repositories in the form of solid-state memories, optical media, and magnetic media.

The approaches described above may be amenable to a cloud quantum computing system, where quantum computing is provided as a shared service to separate users. One example is described in patent application Ser. No. 15/446,973, "Quantum Computing as a Service," which is incorporated herein by reference.

14. Additional Considerations

The disclosure above describes example embodiments for purposes of illustration only. Any features that are described as essential, important, or otherwise implied to be required should be interpreted as only being required for that embodiment and are not necessarily included in other embodiments.

Additionally, the above disclosure often uses the phrase "we" (and other similar phases) to reference an entity that is performing an operation (e.g., a step in an algorithm). These phrases are used for convenience. These phrases may refer to a computing system (e.g., including a classical computing system and a quantum computing system) that is performing the described operations.

Some portions of above description describe the embodiments in terms of algorithmic processes or operations. These algorithmic descriptions and representations are commonly used by those skilled in the computing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. In some cases, a module can be implemented in hardware, firmware, or software.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Similarly, use of "a" or "an" preceding an element or component is done merely for convenience. This description should be understood to mean that one or more of the elements or components are present unless it is obvious that it is meant otherwise. As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments. This is done merely for convenience and to give a general sense of the disclosure. This description should be read to include one or at least one and the singular also includes the plural unless it is obvious that it is meant otherwise. Where values are described as "approximate" or "substantially" (or their derivatives), such values should be construed as accurate+/−10% unless another meaning is apparent from the context. From example, "approximately ten" should be understood to mean "in a range from nine to eleven."

Alternative embodiments are implemented in computer hardware, firmware, software, and/or combinations thereof. Implementations can be implemented in a computer program product tangibly embodied in a machine-readable storage device for execution by a programmable processor; and method steps can be performed by a programmable processor executing a program of instructions to perform functions by operating on input data and generating output. As used herein, 'processor' may refer to one or more processors. Embodiments can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random-access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits) and other forms of hardware.

Although the above description contains many specifics, these should not be construed as limiting the scope of the invention but merely as illustrating different examples. It should be appreciated that the scope of the disclosure includes other embodiments not discussed in detail above. Various other modifications, changes, and variations which will be apparent to those skilled in the art may be made in the arrangement, operation, and details of the methods and apparatuses disclosed herein without departing from the spirit and scope of the invention.

What is claimed is:

1. A method for executing a quantum circuit to implement a layer of a neural network, the layer having n>0 input nodes, d>0 output nodes, and an orthogonal weight matrix, the method comprising:
   executing at least O(log(n)) layers of the quantum circuit that apply BS gates, each BS gate being a single parameterized two-qubit gate, the number of BS gates being equal to the number of degrees of freedom of the orthogonal weight matrix.

2. The method of claim 1, wherein the number of BS gates in the at least O(log(n)) layers of the quantum circuit is equal to (2n-1-d)*d/2.

3. The method of claim 1, wherein the at least O(log(n)) layers of the quantum circuit only include BS gates.

4. The method of claim 1, wherein the at least O(log(n)) layers of the quantum circuit are executed by a quantum computing system and the BS gates are applied to x>0 qubits of the quantum computing system.

5. The method of claim 4, wherein the number of qubits x equals the number of input nodes n of the layer of the neural network.

6. The method of claim 4, wherein each BS gate is applied to adjacent qubits of the quantum computing system.

7. The method of claim 4, wherein the at least O(log(n)) layers of the quantum circuit include:
   a first layer comprising a first BS gate applied to a first qubit and a second qubit;
   a second layer comprising a second BS gate applied to the second qubit and a third qubit;
   a third layer comprising a third BS gate applied to the third qubit and a fourth qubit; and
   a fourth layer comprising a fourth BS gate applied the fourth qubit and a fifth qubit.

8. The method of claim 7, wherein:
   the third layer further includes a fifth BS gate applied to the first qubit and the second qubit; and
   the fourth layer further includes a sixth BS gate applied to the second qubit and the third qubit.

9. The method of claim 7, wherein:
   the first layer further includes a fifth BS gate applied to a seventh qubit and an eighth qubit;
   the second layer further includes a sixth BS gate applied to a sixth qubit and the seventh qubit; and
   the third layer further includes a seventh BS gate applied to the fifth qubit and the sixth qubit.

10. The method of claim 4, further comprising: preparing a first unary quantum state on the x qubits of the quantum computing system, the first unary quantum state corresponding to input data to be applied to the layer of the neural network.

11. The method of claim 10, wherein an output quantum state formed on the x qubits by executing at least the at least O(log(n)) layers is a second unary quantum state, the second unary quantum state corresponding to output data of the layer of the neural network.

12. The method of claim 10, wherein preparing the first unary quantum state on the x qubits comprises:
   executing a first layer of the quantum circuit that applies an X gate to one of the x qubits; and
   after executing the first layer of the quantum circuit, executing n-1 layers of the quantum circuit that apply n-1 BS gates to the x qubits of the quantum computing system, wherein one or more of the at least O(log(n)) layers of the quantum circuit are executed concurrently with one or more of the n-1 layers.

13. The method of claim 4, wherein the at least O(log(n)) layers of the quantum circuit include:
   a first layer comprising a first BS gate applied to a first qubit and a fifth qubit;
   a second layer comprising a second BS gate applied to a second qubit and a sixth qubit;
   a third layer comprising a third BS gate applied to a third qubit and a seventh qubit;
   a fourth layer comprising a fourth BS gate applied to a fourth qubit and an eighth qubit;
   a fifth layer comprising a fifth BS gate applied to the first qubit and the third qubit, and a sixth BS gate applied to the fifth qubit and the seventh qubit;
   a sixth layer comprising a seventh BS gate applied to the second qubit and the fourth qubit, and an eighth BS gate applied to the sixth qubit and the eighth qubit; and
   a seventh layer comprising:
      a ninth BS gate applied to the first qubit and the second qubit;
      a tenth BS gate applied to the third qubit and the fourth qubit;
      an eleventh BS gate applied to the fifth qubit and the sixth qubit; and
      a twelfth BS gate applied to the seventh qubit and the eighth qubit.

14. The method of claim 4, wherein the at least O(log(n)) layers of the quantum circuit include:
   a first layer comprising:
      a first BS gate applied to a first qubit and a second qubit;
      a second BS gate applied to a third qubit and a fourth qubit;
      a third BS gate applied to a fifth qubit and a sixth qubit; and
      a fourth BS gate applied to a seventh qubit and an eighth qubit; and
   a second layer comprising:
      a fifth BS gate applied to the second qubit and the third qubit;
      a sixth BS gate applied to the fourth qubit and the fifth qubit; and
      a seventh BS gate applied to the sixth qubit and the seventh qubit.

15. The method of claim 1, wherein the at least O(log(n)) layers of the quantum circuit are executed by a classical computing system simulating a quantum computing system.

16. A non-transitory computer-readable storage medium comprising stored instructions for executing a quantum circuit to implement a layer of a neural network, the layer having n>0 input nodes, d>0 output nodes, and an orthogonal weight matrix, the stored instructions, when executed by a computing system, cause the computing system to perform operations comprising:
   executing at least O(log(n)) layers of the quantum circuit that apply BS gates, each BS gate being a single parameterized two-qubit gate, the number of BS gates being equal to the number of degrees of freedom of the orthogonal weight matrix.

17. The non-transitory computer-readable storage medium of claim 16, wherein the number of BS gates in the at least O(log(n)) layers is equal to (2n-1-d)*d/2.

18. The non-transitory computer-readable storage medium of claim 16, wherein the at least O(log(n)) layers of the quantum circuit only include BS gates.

19. The non-transitory computer-readable storage medium of claim 16, wherein the computing system includes a quantum computing system, wherein the at least O(log(n)) layers of the quantum circuit are executed by the quantum computing system and the BS gates are applied to x>0 qubits of the quantum computing system.

20. The non-transitory computer-readable storage medium of claim 19, wherein the number of qubits x equals the number of input nodes n of the layer of the neural network.

* * * * *